US012737678B2

(12) United States Patent
Sun et al.

(10) Patent No.: US 12,737,678 B2
(45) Date of Patent: Sep. 15, 2026

(54) ELECTRONIC DEVICE AND METHOD FOR FEDERATED LEARNING

(71) Applicant: Sony Group Corporation, Tokyo (JP)

(72) Inventors: Chen Sun, Beijing (CN); Songtao Wu, Beijing (CN); Tao Cui, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 726 days.

(21) Appl. No.: 18/027,371

(22) PCT Filed: Oct. 28, 2021

(86) PCT No.: PCT/CN2021/126875

§ 371 (c)(1), (2) Date: Mar. 21, 2023

(87) PCT Pub. No.: WO2022/089507

PCT Pub. Date: May 5, 2022

(65) Prior Publication Data

US 2023/0385688 A1 Nov. 30, 2023

(30) Foreign Application Priority Data

Oct. 28, 2020 (CN) ........................ 202011173054.X

(51) Int. Cl.
*G06N 20/00* (2019.01)

(52) U.S. Cl.
CPC ................................... *G06N 20/00* (2019.01)

(58) Field of Classification Search
None
See application file for complete search history.

(56) References Cited

U.S. PATENT DOCUMENTS 10,003,502 B1 6/2018 Bernardo De Oliveira
2018/0373956 A1 12/2018 Yamato
2018/0373988 A1* 12/2018 Dhanyamraju .......... G06N 5/02
(Continued)

FOREIGN PATENT DOCUMENTS

CN 110167176 A * 8/2019 ............... G06N 3/08
CN 111090631 A * 5/2020 ........... G06F 16/176
(Continued)

OTHER PUBLICATIONS

International Search Report and Written Opinion mailed on Jan. 26, 2022, received for PCT Application PCT/CN2021/126875, filed on Oct. 28, 2021, 9 pages including English Translation.

*Primary Examiner* — Haimei Jiang
(74) *Attorney, Agent, or Firm* — XSENSUS LLP

(57) ABSTRACT

The present disclosure provides an electronic device and a method for federated learning. The electronic device for federated learning at a central processing apparatus comprises a processing circuitry which is configured to: determine a group of distributed nodes for generating a global model parameter among a plurality of distributed nodes, wherein the correlation between local training data of the group of distributed nodes meets a specific correlation requirement; and generate the global model parameter based on local model parameters of the group of distributed nodes, wherein the local model parameters are generated by the group of distributed nodes based on respective local training data thereof.

12 Claims, 13 Drawing Sheets

(56) References Cited

U.S. PATENT DOCUMENTS

| | | | | |
|---|---|---|---|---|
| 2020/0219010 | A1* | 7/2020 | Jobling | G06F 16/285 |
| 2025/0209383 | A1* | 6/2025 | Hu | G06N 5/04 |

FOREIGN PATENT DOCUMENTS

| | | | | | |
|---|---|---|---|---|---|
| CN | 111325351 | A | * | 6/2020 | G06N 20/00 |
| CN | 111369042 | A | * | 7/2020 | H04W 24/06 |
| CN | 111754000 | A | * | 10/2020 | G06Q 30/08 |
| CN | 111784002 | A | * | 10/2020 | G06F 18/2136 |
| CN | 215117297 | U | * | 12/2021 | |
| JP | 2017111501 | A | | 6/2017 | |
| JP | 2022524662 | A | * | 5/2022 | G06V 10/7753 |
| WO | WO-2019112667 | A1 | * | 6/2019 | G06N 20/00 |

* cited by examiner

Figure 15:
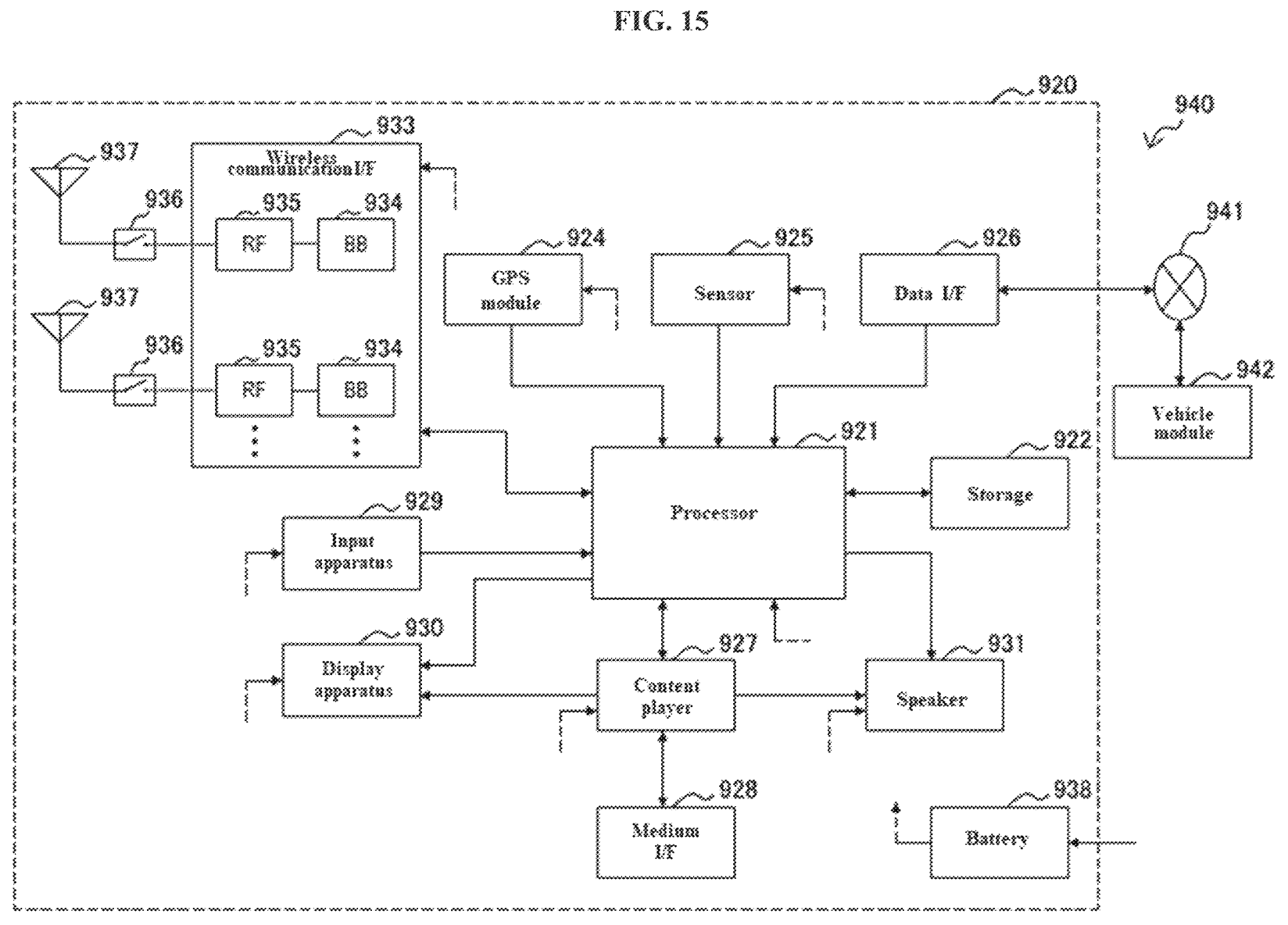

940
941
942 Vehicle module
920
926 Data I/F
922 Storage
931 Speaker
938 Battery
925 Sensor
921 Processor
927 Content player
928 Medium I/F
924 GPS module
933 Wireless communication I/F
934 BB
935 RF
936
937
929 Input apparatus
930 Display apparatus

ELECTRONIC DEVICE AND METHOD FOR FEDERATED LEARNING

CROSS-REFERENCE TO RELATED APPLICATIONS

This application is based on PCT filing PCT/CN2021/126875, filed on Oct. 28, 2021, which claims the priority of the Chinese patent application titled "ELECTRONIC DEVICE AND METHOD FOR FEDERATED LEARNING", No. 202011173054.X, filed on Oct. 28, 2020, the entire contents of each are incorporated herein by reference.

TECHNICAL FIELD

The present disclosure relates to electronic device and method for federated learning.

BACKGROUND

Federated Learning is an emerging fundamental technology for artificial intelligence. It was first proposed by Google in 2016, and it was originally used to solve the problem of Android mobile phone end users updating models locally. Its design goal is to carry out efficient machine learning among multiple participants or multiple computing nodes under the premise of ensuring information security during big data exchange, protecting terminal data and personal data privacy, and ensuring legal compliance. The machine learning algorithms that can be used in federated learning are not limited to neural networks, but also include important algorithms such as random forests. Federated learning is expected to be the basis for next-generation artificial intelligence collaborative algorithms and collaborative networks.

FIG. 1 is a schematic diagram illustrating a federated learning system in the prior art. As shown in FIG. 1, $UE_1$, $UE_2$ . . . $UE_K$ are distributed nodes for federated learning implemented by user devices. The AP is a central processing apparatus implemented by the base station for federated learning. Each distributed node $UE_1$, $UE_2$ . . . $UE_K$ generates local model parameters $$w_1^t, w_2^t \dots w_K^t$$

according to its own local training data $D_1$, $D_2$ . . . $D_K$ using an artificial intelligence algorithm (e.g., gradient descent) and uploads them to the central processing apparatus AP. The central processing apparatus AP generates a global model parameter $w^{t+1}$ (i.e., global aggregation) based on the received local model parameters $$w_1^t, w_2^t \dots w_K^t$$

and distributes to individual distributed nodes $UE_1$, $UE_2$ . . . $UE_K$.

In this way, the central processing apparatus AP is able to train a statistical model from data stored in a large number of distributed nodes UE without sacrificing the privacy of individual distributed nodes UE. However, the federated learning system faces new challenges. Unlike centralized learning in data centers, federated learning typically operates in wireless edge networks, where channel resources are limited and unreliable. The central processing apparatus AP usually needs to link a large number of distributed nodes UE through resource-limited spectrum. Therefore, each global aggregation only allows a limited number of distributed nodes UE to transmit their trained local model parameters through unreliable channels.

SUMMARY

The inventors of the present disclosure found that, in a case that a certain number of distributed nodes have to be selected to upload local model parameters, if local training data of each selected distributed node has a high correlation, models learned by these distributed node are similar, thus it cannot ensure rapid convergence of the global model. Therefore, there is a need for a technical solution capable of improving the efficiency of the federated learning system in the case of limited channel resources.

In order to solve this technical problem, the technical solution proposed in the disclosure schedules the distributed nodes to upload their local model parameters according to the correlation between the local training data of the distributed nodes to promote the rapid convergence of the global model. The technical solution disclosed in the present disclosure can effectively utilize limited channel resources to improve the efficiency of a federated learning system.

According to one aspect of the present disclosure, there is provided an electronic device for federated learning at a central processing apparatus, including a processing circuitry configured to: determine a group of distributed nodes for generating a global model parameter among a plurality of distributed nodes, wherein the correlation between local training data of the group of distributed nodes meets a specific correlation requirement; and generate the global model parameter based on local model parameters of the group of distributed nodes, wherein the local model parameters are generated by the group of distributed nodes based on respective local training data thereof.

According to another aspect of the present disclosure, there is provided an electronic device for federated learning at a specific distributed node, including a processing circuitry configured to: determine that the specific distributed node will be use to generate a global model parameter, wherein the correlation between local training data of the specific distributed node and local training data of other distributed nodes used to generate the global model parameter meets a specific correlation requirement; and upload the local model parameter of the specific distributed node to a central processing apparatus, wherein the local model parameter is generated by the specific distributed node based on its local training data.

According to another aspect of the present disclosure, there is provided a method for federated learning at a central processing apparatus, including: determining a group of distributed nodes for generating a global model parameter among a plurality of distributed nodes, wherein the correlation between local training data of the group of distributed nodes meets a specific correlation requirement; and generating the global model parameter based on local model parameters of the group of distributed nodes, wherein the local model parameters are generated by the group of distributed nodes based on respective local training data thereof.

According to another aspect of the present disclosure, there is provided a method for federated learning at a specific distributed node, including: determining that the specific distributed node will be used to generate a global model parameter, wherein the correlation between local training data of the specific distributed node and local training data of other distributed nodes that have been determined to be used to generate the global model parameter meets a specific correlation requirement; and uploading the local model parameter of the specific distributed node to a central processing apparatus, wherein the local model parameter is generated by the specific distributed node based on its local training data.

According to another aspect of the present disclosure, there is provided a non-transitory computer-readable storage medium having instructions stored thereon, which, when executed by a processor, cause the processor to perform the methods of the present disclosure.

According to another aspect of the present disclosure, there is provided an apparatus for federated learning, including components for performing various steps of the methods of the present disclosure.

BRIEF DESCRIPTION OF THE DRAWINGS

A better understanding of the present disclosure can be obtained when following detailed description of the embodiments is considered in conjunction with accompanying drawings. The same or similar reference numerals are used in the drawings to refer to the same or similar parts. The drawings, together with the specific description below, are included in and forms part of the specification, and are used to illustrate the embodiments of the present disclosure and explain the principles and advantages of the present disclosure.

FIG. 15 is a block diagram illustrating an example of a schematic configuration of a car navigation device to which the technology of the present disclosure can be applied.

DETAILED DESCRIPTION

Figure 1:
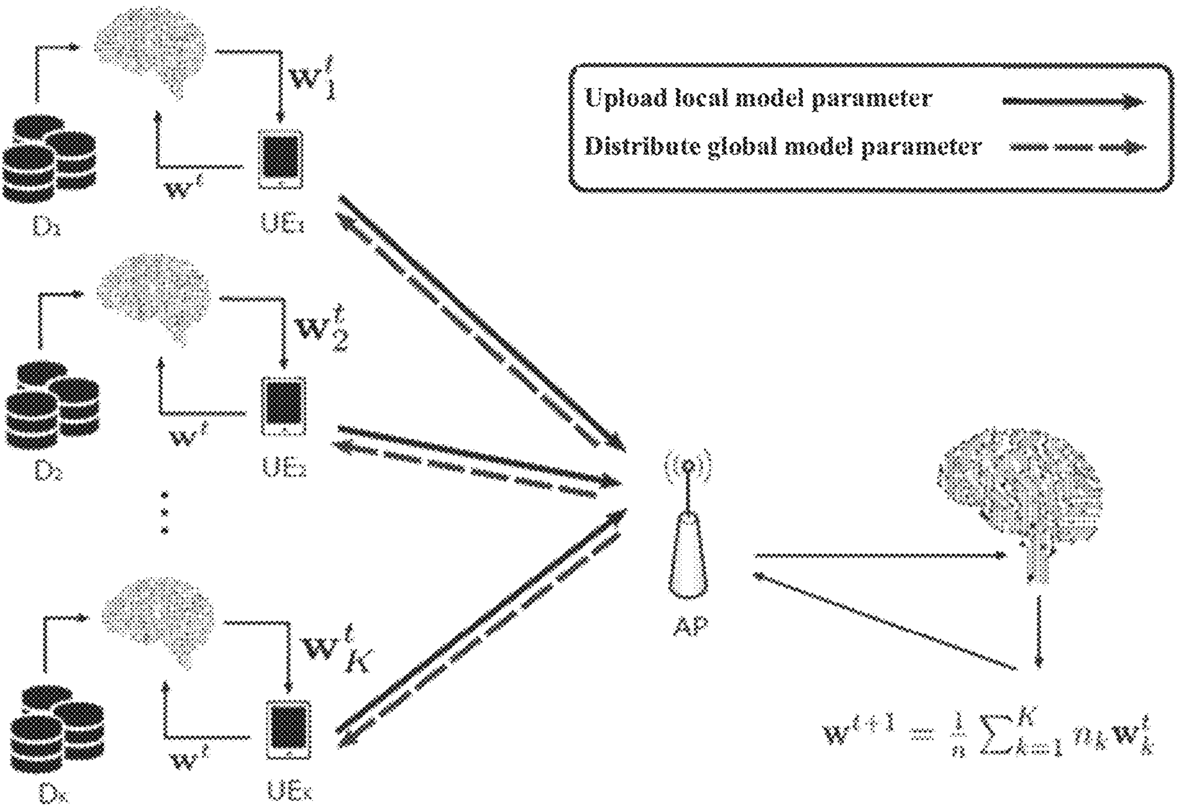
FIG. 1 is a schematic diagram illustrating a federated learning system in the prior art.

Hereinafter, preferred embodiments of the present disclosure will be described in detail with reference to the accompanying drawings. Note that in the specification and drawings, the same reference numerals are used to denote structural elements having substantially the same function and structure, and repeated descriptions of these structural elements are omitted.

The description will be made in the following order:

1. System overview
2. Process flow
3. Simulation results
4. Application examples

1. System Overview

Figure 2:
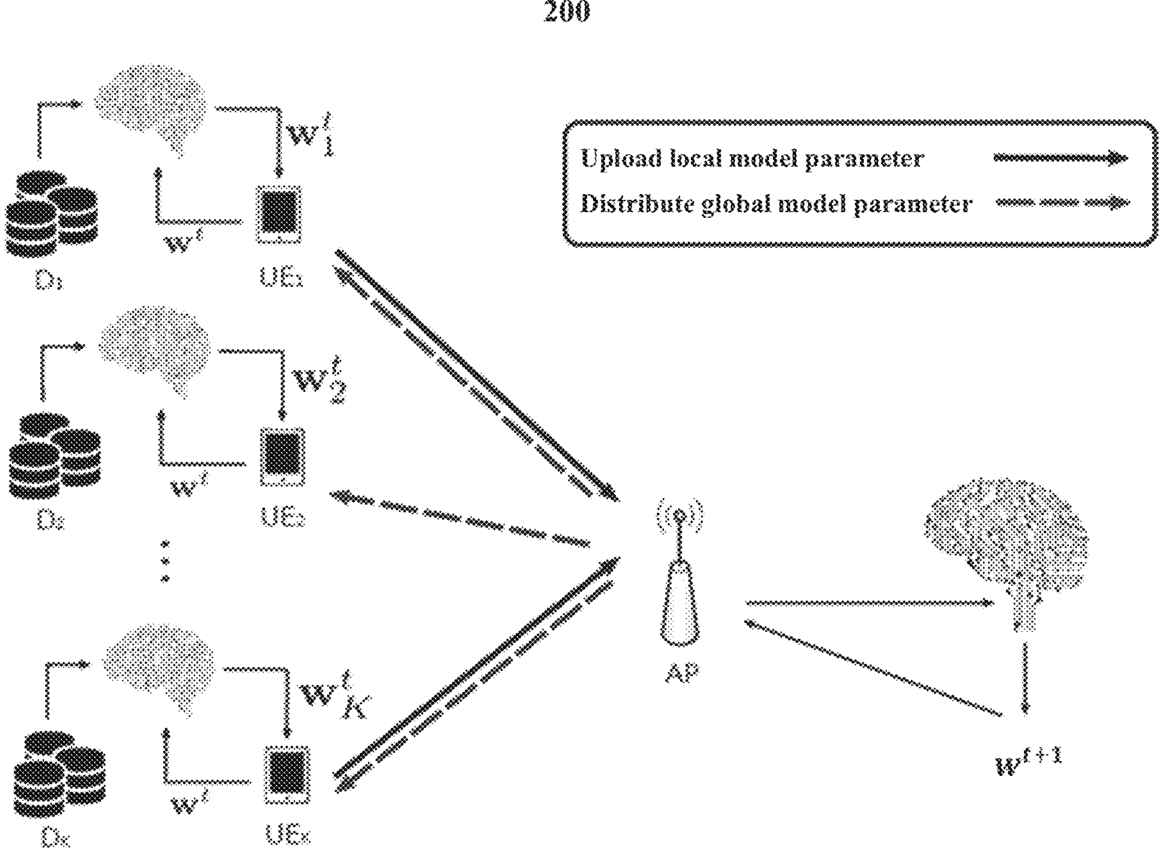
FIG. 2 is a schematic diagram illustrating a federated learning system according to some embodiments of the present disclosure.

First, a federated learning system according to some embodiments of the present disclosure will be described. FIG. 2 is a schematic diagram illustrating a federated learning system 200 according to some embodiments of the present disclosure. As shown in FIG. 2, the federated learning system 200 includes a plurality of distributed nodes $UE_1$, $UE_2$ . . . $UE_K$ implemented by user devices and a central processing apparatus AP implemented by a base station. Each distributed node $UE_1$, $UE_2$ . . . $UE_K$ generates local model parameters $$w_1^t, w_2^t \ldots w_K^t$$

according to its own local training data $D_1$, $D_2$ . . . $D_K$ using an artificial intelligence algorithm (such as gradient descent).

Different from the federated learning system in FIG. 1, only one group of distributed nodes among the plurality of distributed nodes $UE_1$, $UE_2$ . . . $UE_K$ in the federated learning system 200 in FIG. 2 are determined to be used for generating a global model parameter. The group of distributed nodes upload local model parameters to the central processing apparatus AP, but the distributed nodes not used for generating the global model parameter (for example, the distributed node $UE_2$) do not upload local model parameters to the central processing apparatus AP. The central processing apparatus AP generates the global model parameter $w^{t+1}$ based only on the local model parameters of the group of distributed nodes.

Same as the federated learning system in FIG. 1, the central processing apparatus AP in the federated learning system 200 in FIG. 2 distributes the generated global model parameter $w^{t+1}$ to all distributed nodes $UE_1$, $UE_2$ . . . $UE_K$, including those distributed nodes that did not upload local model parameters (e.g., distributed node $UE_2$). After receiving the newly generated global model parameter $w^{t+1}$, the distributed nodes $UE_1, UE_2 \ldots UE_K$ use the newly generated global model parameter $w^{t+1}$ to perform next round of local model training or apply the federated learning model based on the newly generated global model parameter $w^{t+1}$.

In the embodiment shown in FIG. 2, the distributed nodes are implemented by user devices, the central processing apparatus is implemented by abase station, and wireless communication is performed between them. In some embodiments, the central processing apparatus can also be implemented by an apparatus separate from the base station. In this case, the distributed nodes upload the local model parameters to the base station, and the base station provides them to the central processing apparatus, and the central processing apparatus provides the generated global model parameter to the base station, and the base station distributes them to the distributed nodes. The communication system composed of distributed nodes and central processing apparatus can be a cellular communication system, a Machine Type Communication (MTC) system, an ad hoc network or a cognitive radio system (for example, an IEEE P802.19.1a and Spectrum Access System (SAS)), etc.

In addition, in some embodiments of the present disclosure, the distributed nodes and the central processing apparatus can also be implemented by other devices, and wired communication may be performed between them.

2. Process Flow

The flows of federated learning processes in distributed nodes and central processing apparatus will be described below. In an embodiment of the present disclosure, federated learning processes in distributed nodes and/or central processing apparatus may be performed by an electronic device implemented as a distributed node and/or a central processing apparatus itself or components thereof (e.g., chips). The electronic device may include a processing circuitry. The processing circuitry can output signals (digital or analog) to distributed nodes and/or other components in the central processing apparatus, or receive signals (digital or analog) from distributed nodes and/or other components in the central processing apparatus. In addition, the processing circuitry may also control some or all of operations of the distributed nodes and/or other components in the central processing apparatus.

The processing circuitry may be in the form of a general purpose processor or a dedicated processing circuitry such as an ASIC. For example, the processing circuitry can be configured by a circuit (hardware) or a central processing device (such as a central processing unit (CPU)). In addition, a program (software) for operating a circuit (hardware) or a central processing device may be carried on the processing circuitry. The program can be stored in a memory (such as arranged in distributed nodes and/or a central processing apparatus or electronic devices) or an external storage medium connected from outside, and can be downloaded via a network (such as the Internet).

Figure 3:
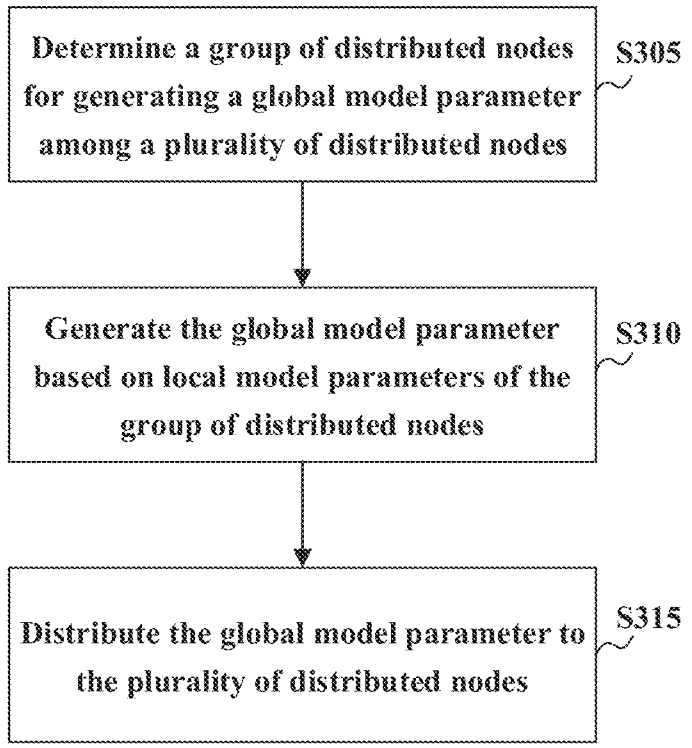
FIG. 3 is a flowchart illustrating a federated learning process 300 in a central processing apparatus according to some embodiments of the present disclosure.

FIG. 3 is a flowchart illustrating a federated learning process 300 in a central processing apparatus according to some embodiments of the present disclosure.

In step S305, the central processing apparatus determines a group of distributed nodes for generating a global model parameter among a plurality of distributed nodes. The correlation between local training data of the group of distributed nodes meets a specific correlation requirement, and is able to obtain channel resources (e.g., time resources, frequency resources and/or space resources) for transmitting local model parameters to the central processing apparatus.

There may be correlations between local training data of a plurality of distributed nodes. High correlation will lead to similar local training results of the plurality of distributed nodes, making it impossible to ensure that the global training results quickly approach the global optimum in a case that channel resources are limited. By selecting distributed nodes with low correlation between local training data and making distributed nodes with low correlation obtain channel resources for uploading local training results (that is, local model parameters) first, it helps to effectively use channel resources in a case of that channel resources are limited, so that the global training results can quickly approach the global optimum. The correlation between the local training data of the distributed nodes can be determined by several methods listed below or other methods.

In some application scenarios, local training data of distributed nodes comes from their sampling of surrounding environment. For example, a distributed node can be implemented as a sensor node (for example, a temperature collection node), whose local training data comes from a sensor disposed on it, or as a camera node, whose local training data comes from data collected by a camera disposed on it. For several distributed nodes with similar distances, if collection times of local training data are similar, the correlation of their local training data is high. Therefore, the correlation between the local training data of a plurality of distributed nodes can be determined according to the collection times of the local training data. A specific correlation requirement can be set such that the time interval between collection times of local training data of distributed nodes used to generate the global model parameter is greater than a specific time interval threshold to ensure that the correlation between local training data of the distributed nodes used to generate the global model parameter is low. The distributed nodes can also be sorted according to time intervals between collection times of local training data, and the distributed nodes with large time intervals are preferentially selected as distributed nodes for generating a global model parameter due to low correlation to upload local models parameter. Furthermore, where the data collection time is a time period, the specific correlation requirement can be set such that the overlapping time period between collection times of local training data of the distributed nodes used to generate the global model parameter is less than a specific overlapping time threshold, to ensure that the correlation between local training data of the distributed nodes used to generate the global model parameter is low.

In addition, if distributed nodes are close in distance, it will also lead to high correlation of their local training data. Therefore, the correlation between local training data of a plurality of distributed nodes can also be determined according to the distances between distributed nodes. The specific correlation requirement can be set such that the distance between node locations of the distributed nodes used to generate the global model parameter is greater than a specific distance threshold, to ensure the correlation between local training data of the distributed nodes used to generate the global model parameter is low. The distributed nodes can also be sorted according to the distances between the node locations, and the nodes with far distances are preferentially selected as distributed nodes for generating a global model parameter due to their low correlation to upload local model parameters, so as to ensure that the correlation between local training data of distributed nodes selected to generate global model parameter is low.

Each distributed node can be set an associated exclusive region, so that a group of distributed nodes selected for generating a global model parameter are outside each other's exclusive region to ensure that the correlation between the local training data of the group of distributed nodes is low. The specific correlation requirement may be set such that each of the distributed nodes used to generate the global model parameter is outside associated exclusive regions of the remaining ones of the distributed nodes used to generate the global model parameter. When a certain distributed node is selected as a distributed node for generating a global model parameter, distributed nodes located in its associated exclusive region are no longer selected as distributed nodes for generating a global model parameter.

The associated exclusive region of each distributed node may be defined by the region in which distances of individual points from the distributed node are less than the exclusive distance. For example, the exclusive region of each distributed node may be a circular region with the distributed node as the center and the exclusive distance as the radius. Alternatively, the associated exclusive region of each distributed node may be defined by a set of a second predetermined number of distributed nodes closest to the distributed node. For example, the exclusive region of each distributed node may be a set of a second predetermined number of nearest neighbor nodes found with the distributed node as the center from the distributed node based on the distance. The exclusive distance and the second predetermined number may be predetermined according to one or more of the distribution density of distributed nodes, the distribution density of observation objects, and the maximum correlation tolerance.

In addition, the relationship between the correlation between the local training data of distributed nodes and distance can be determined according to distribution statistics information of distributed nodes. After the relationship between the correlation and the distance is determined, the correlation between the training data of the distributed nodes can be determined according to the distance between the distributed nodes. For example, assuming that node locations of distributed nodes obey the Poisson point process, and physical locations of collected objects obey another Poisson point process, assuming that data is collected by a camera on the distributed nodes and the coverage of the cameras are limited, then the function of the correlation between the training data of distributed nodes and the distance between distributed nodes can be obtained by simulation or theoretical calculation. In addition, the relationship between the correlation between the local training data and the distance between the distributed nodes can also be provided to the central processing apparatus or the distributed nodes by a third party.

Figure 4:
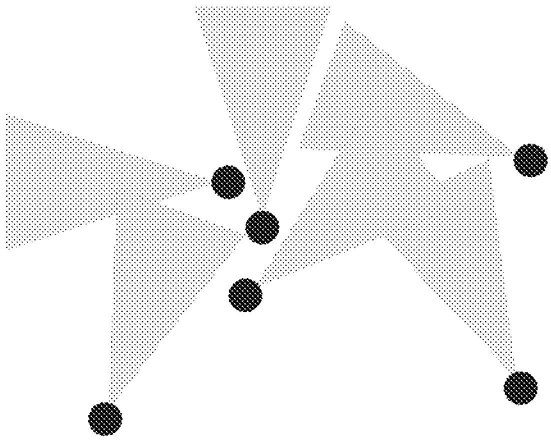
FIG. 4 is a schematic diagram illustrating distribution of distributed nodes implemented as camera nodes according to some embodiments of the present disclosure.

In a case that the distributed nodes are implemented as camera nodes, the relationship between the correlation between the training data collected by the cameras and distance where the camera density is given can be calculated according to distribution locations and angles of the cameras, using the overlapping area of the coverage regions of the cameras. FIG. 4 is a schematic diagram illustrating distribution of distributed nodes implemented as camera nodes according to some embodiments of the present disclosure. In FIG. 4, dots represent distributed nodes implemented as camera nodes, and triangular areas represent coverage regions (i.e., camera ranges) of camera nodes.

In some application scenarios, the local training data of distributed nodes is generated by a pre-set generative model. The same generative models may lead to generated training data with large correlations. Therefore, the correlation between the local training data of a plurality of distributed nodes can be determined according to the generative model of the local training data. The specific correlation requirement can be set such that the local training data of the distributed nodes used to generate the global model parameter have different generative models to ensure that the correlation between the local training data of the distributed nodes used to generate the global model parameter is low.

In some application scenarios, distributed nodes use open source platforms as data sources, that is, their local training data comes from open source platforms. Training data from the same open source platform has great correlation. Therefore, the correlation between local training data of a plurality of distributed nodes can be determined according to data sources of the local training data. The specific correlation requirement can be set such that data sources for local training data of distributed nodes used to generate global model parameter are different to ensure that the correlation between the local training data of distributed nodes used to generate global model parameter is low.

Returning to FIG. 3, in step S310, the central processing apparatus generates the global model parameter based on local model parameters of the group of distributed nodes. The local model parameters are generated by the group of distributed nodes based on respective local training data thereof. In step S315, the central processing apparatus distributes the generated global model parameter to the plurality of distributed nodes.

Figure 5:
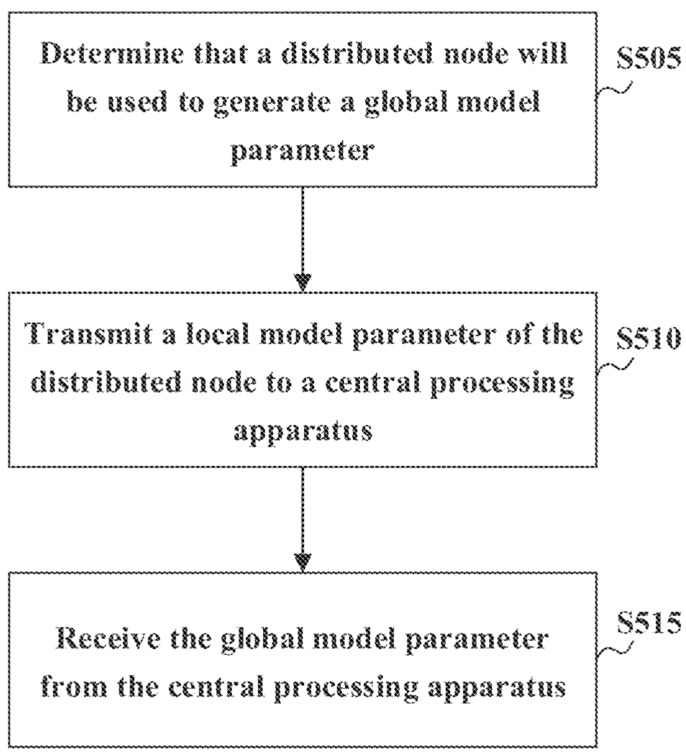
FIG. 5 is a flowchart illustrating a federated learning process 500 in a distributed node according to some embodiments of the present disclosure.

FIG. 5 is a flowchart illustrating a federated learning process 500 in a distributed node according to some embodiments of the present disclosure. In step S505, the distributed node determines that it will be used to generate a global model parameter. The correlation between local training data of the distributed node and local training data of other distributed nodes used to generate the global model parameter meets a specific correlation requirement, and is able to obtain channel resources (e.g., time resources, frequency resources and/or space resources) for transmitting the local model parameter to a central processing apparatus. This particular correlation requirement may be the correlation requirement described above with reference to FIG. 3. In step S510, the distributed node transmits its local model parameter to the central processing apparatus through the obtained channel resources. The local model parameter is generated by the distributed node based on its local training data. In step S515, the distributed node receive a global model parameter from the central processing apparatus.

In some embodiments of the present disclosure, the step of determining distributed nodes for generating a global model parameter in a central processing apparatus and a distributed node may be performed in a centralized manner based on the selection of distributed nodes in the central processing apparatus. Alternatively, in some embodiments of the present disclosure, the step of determining distributed nodes for generating a global model parameter in a central processing apparatus and a distributed node may be performed in a distributed manner based on competition for channel resources among the distributed nodes.

Figure 6:
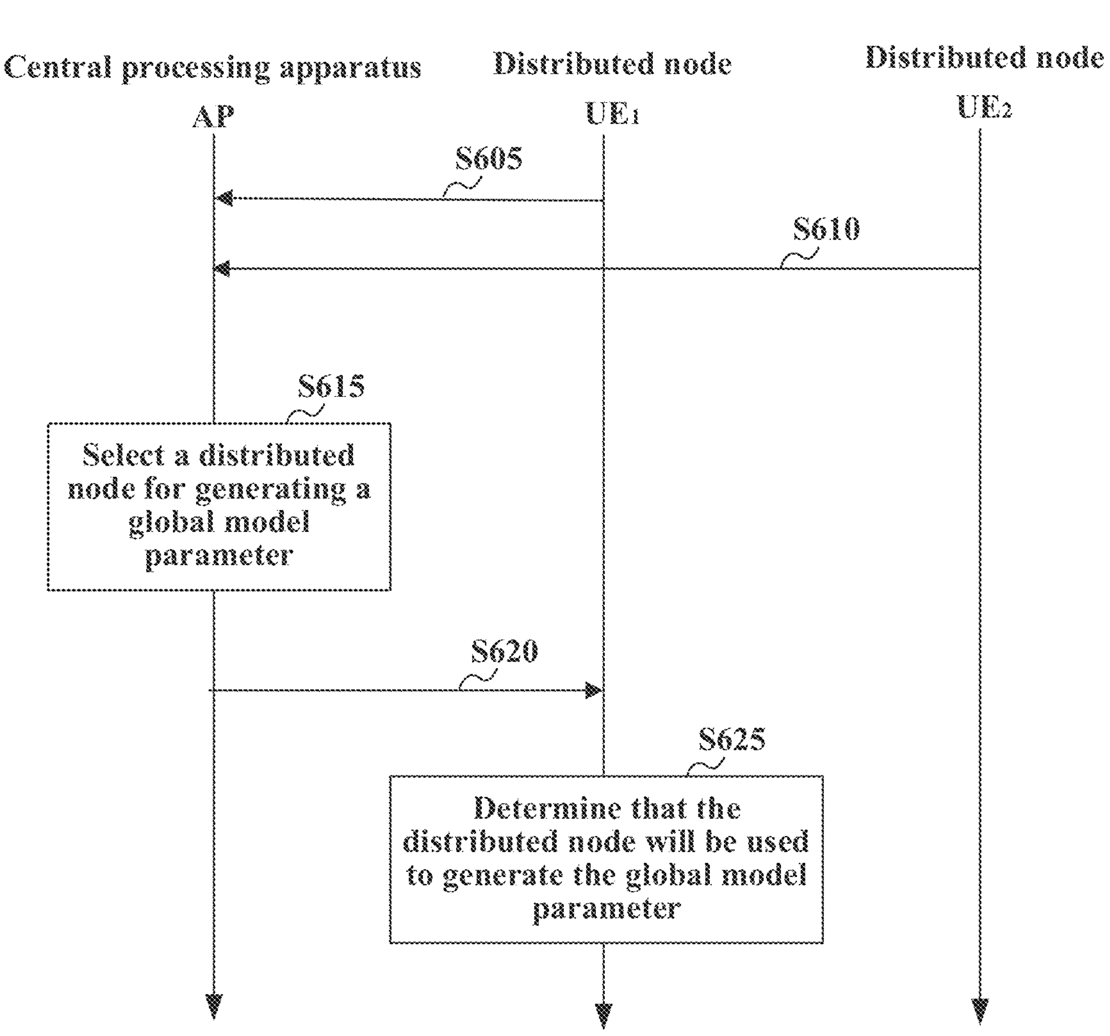
FIG. 6 is a flowchart illustrating a process of determining distributed nodes for generating a global model parameter in a centralized manner, according to some embodiments of the present disclosure.

FIG. 6 is a flowchart illustrating a process 600 of determining distributed nodes for generating a global model parameter in a centralized manner, according to some embodiments of the present disclosure. The process 600 can be implemented through a Radio Resource Control (RRC) procedure. For simplicity, only two distributed nodes $UE_1$ and $UE_2$ are shown in FIG. 6. However, it should be understood that more distributed nodes may be involved in the process 600.

In step S605, the distributed node $UE_1$ transmits the information related to the distributed node $UE_1$ to the central processing apparatus AP, for example, in an uplink resource request, for the central processing apparatus to select distributed nodes for generating a global model parameter. The information related to the distributed node $UE_1$ may include one or more of data collection information of the local training data of the distributed node $UE_1$, network performance parameter, and local training performance parameter.

The data collection information of the local training data of the distributed node $UE_1$ includes one or more of local training data collection time, node location, generative model and data source. The data collection information of the local training data of the distributed node $UE_1$ can be used to determine the correlation between the local training data of the distributed node $UE_1$ and the local training data of other distributed nodes.

The network performance parameter of the distributed node $UE_1$ indicates the network performance of the distributed node $UE_1$, which may include, for example, one or more of the channel bandwidth, degree of interference, and channel quality of the distributed node $UE_1$.

The local training performance parameter of the distributed node $UE_1$ indicates the performance of the distributed node $UE_1$ performing model training locally, which may include, for example, the size or level of update gradient of the objective function for model training.

In step S610, the distributed node $UE_2$ transmits the information related to the distributed node $UE_2$ to the central processing apparatus AP in an uplink resource request, for the central processing apparatus to select distributed nodes for generating a global model parameter. The information related to the distributed node $UE_2$ may include one or more of data collection information of the local training data of the distributed node $UE_2$, network performance parameter, and local training performance parameter.

The data collection information of the local training data of the distributed node $UE_2$ includes one or more of local training data collection time, node location, generative model and data source. The data collection information of the local training data of the distributed node $UE_2$ can be used to determine the correlation between the local training data of the distributed node $UE_2$ and the local training data of other distributed nodes.

The network performance parameter of the distributed node $UE_2$ indicates the network performance of the distributed node $UE_2$, which may include, for example, one or more of the channel bandwidth, degree of interference, and channel quality of the distributed node $UE_2$.

The local training performance parameter of the distributed node $UE_2$ indicates the performance of the distributed node $UE_2$ performing model training locally, which may include, for example, the size or level of update gradient of the objective function for model training.

In step S615, the central processing apparatus AP selects a group of distributed nodes for generating a global model parameter among the plurality of distributed nodes based on the information related to the distributed nodes from the plurality of distributed nodes, so that the correlation between local training data of the selected group of distributed nodes meets a specific correlation requirement. The number of selected distributed nodes may be a first predetermined number. The central processing apparatus AP may allocate channel resources (for example, time resources, frequency resources and/or space resources) for transmitting local model parameters to the selected group of distributed nodes.

In addition, the central processing apparatus AP can also select a group of distributed nodes for generating a global model parameter among the plurality of distributed nodes based on network performance parameters and/or local training performance parameters of the distributed nodes, so that the network performance parameters and/or the local training performance parameters of the selected group of distributed nodes meet a specific network performance requirement and/or a local training performance requirement. By selecting distributed nodes for generating a global model parameter based on the network performance parameters and/or the local training performance parameters of the distributed nodes, the central processing apparatus can select distributed nodes with good network performance and/or high local training performance to generate the global model parameter, so as to be able to improve the efficiency of global model training. For example, some distributed nodes cannot upload local model parameters in time due to poor network performance, or cannot generate local model parameters in time due to poor local training performance, thus affecting the efficiency of global model training. For example, distributed nodes meeting a specific correlation requirement may be located at the edge of a cell and thus have poor channel quality. Therefore, when selecting distributed nodes for generating a global model parameter, the central processing apparatus AP may consider the maximum coverage of a base station, so that distributed nodes located outside the maximum coverage of the base station are not selected.

Figure 7:
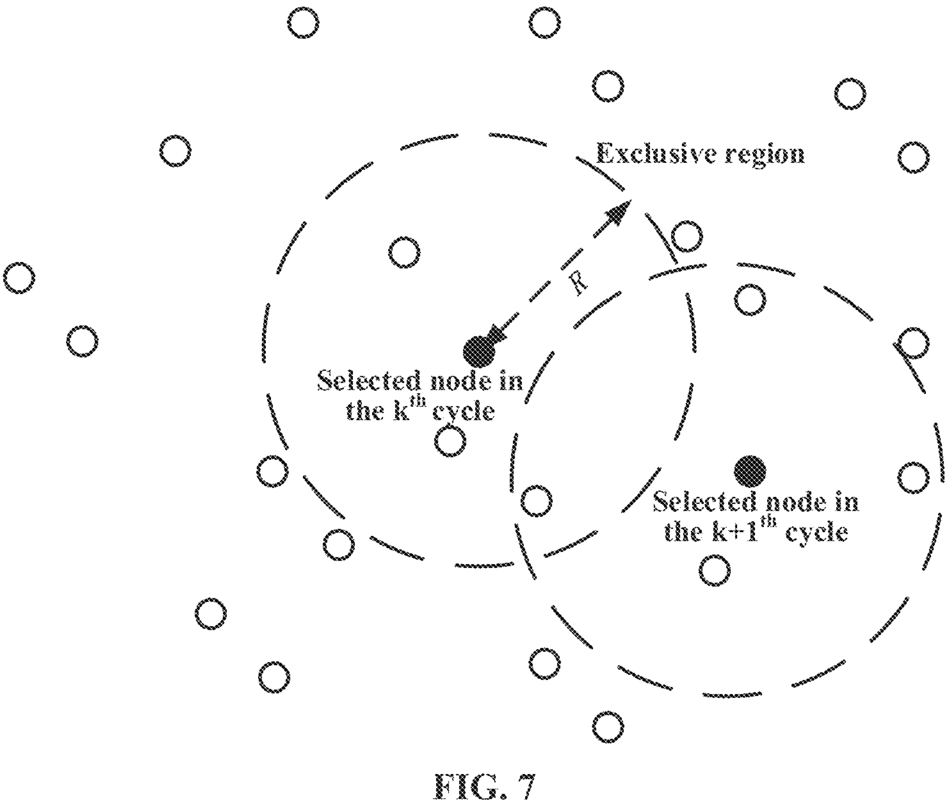
FIG. 7 is a schematic diagram illustrating distributed nodes selected by a central processing apparatus for generating a global model parameter, according to some embodiments of the present disclosure.

FIG. 7 is a schematic diagram illustrating distributed nodes selected by a central processing apparatus for generating a global model parameter according to some embodiments of the present disclosure. In FIG. 7, solid circles represent distributed nodes selected for generating a global model parameter, hollow circles represent distributed nodes not selected for generating a global model parameter, dotted circles represent exclusive regions, and R represents the radius of the exclusive regions.

As shown in FIG. 7, the central processing apparatus selects K distributed nodes for generating a global model parameter through K cycles, one distributed node being selected in each cycle. After selecting k (k is a non-negative integer less than K) distributed nodes, in the k+1th cycle, the central processing apparatus selects the k+1th distributed node from the region outside associated exclusive regions of the selected k distributed nodes. In some embodiments, the central processing apparatus also considers network performances and/or local training performances of distributed nodes when selecting the distributed nodes. In this case, in the k+1th cycle, the central processing apparatus selects the k+1th distributed node of which the network performance parameter and/or the local training performance parameter meet a specific network performance requirement and/or a local training performance requirement from the regions outside the associated exclusive regions of the selected k distributed nodes.

Returning to FIG. 6, in step S620, the central processing apparatus AP transmits an instruction to upload local model parameters to the distributed nodes selected for generating a global model parameter. The central processing apparatus AP may notify the distributed nodes selected for generating a global model parameter of the allocated channel resources. For example, the indication to transmit local model parameters may include an indication of allocated channel resources. For example, in FIG. 6, the central processing apparatus AP transmits an instruction to upload local model parameters to the distributed node $UE_1$.

In step S625, the distributed nodes selected for generating a global model parameter determine that they will be used for generating a global model parameter based on the indication received from the central processing apparatus to upload local model parameters. For example, in FIG. 6, the distributed node $UE_1$ determines that it will be used for generating a global model parameter based on the instruction received from the central processing apparatus to upload local model parameters.

Figure 8:
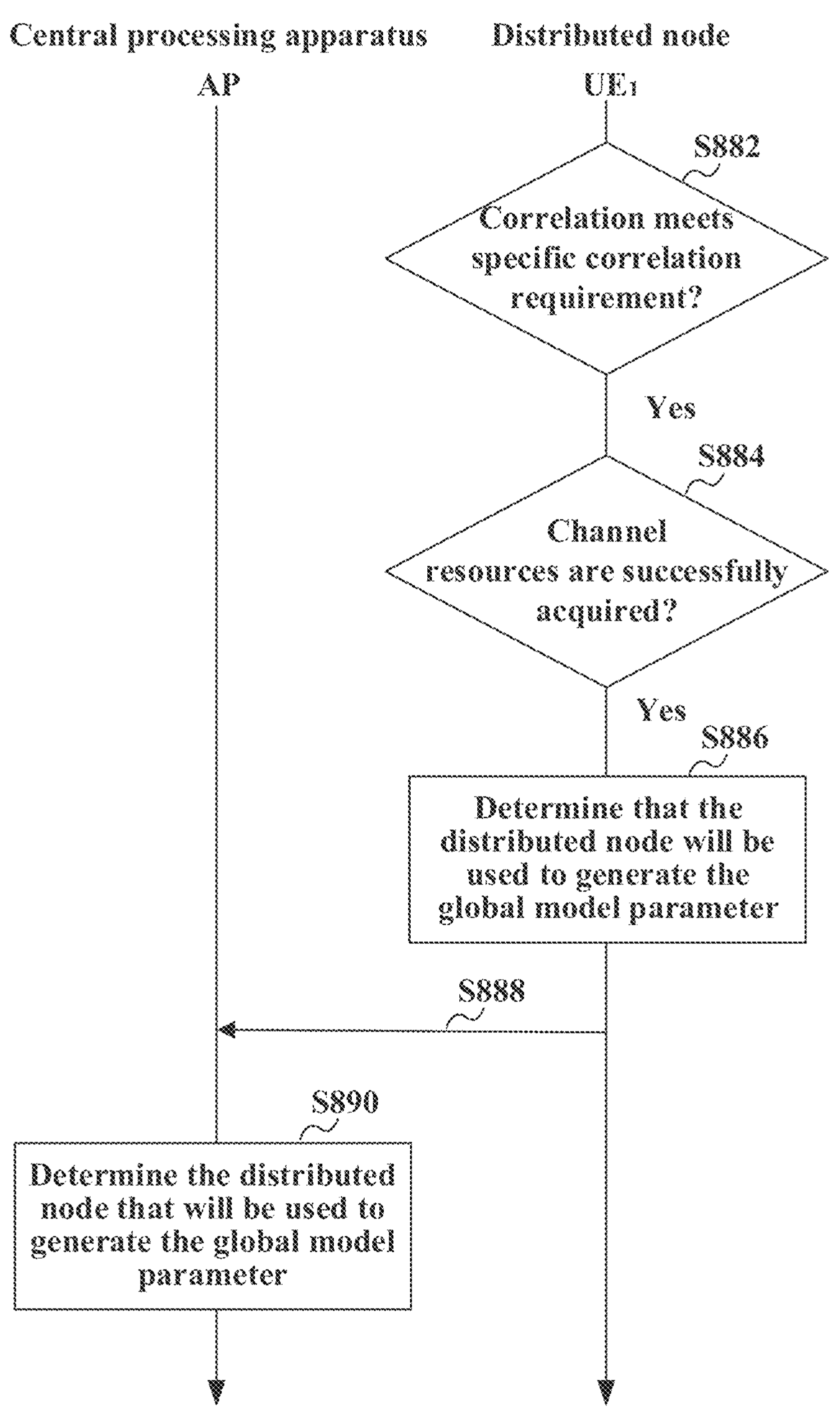
FIG. 8 is a flowchart illustrating a process of determining distributed nodes for generating a global model parameter in a distributed manner, according to some embodiments of the present disclosure.

FIG. 8 is a flowchart illustrating a process 880 of determining distributed nodes for generating a global model parameter in a distributed manner, according to some embodiments of the present disclosure. The process 880 can be implemented through a Radio Resource Control (RRC) procedure. For simplicity, only one distributed node $UE_1$ is shown in FIG. 8. However, it should be understood that more distributed nodes may be involved in the process 880.

In step S882, the distributed node $UE_1$ determines whether the correlation between its local training data and local training data of other distributed nodes that have been determined to be used for generating the global model parameter meets a specific correlation requirement based on data collection information of its local training data and the local training data of other distributed nodes that have been determined to be used for generating the global model parameter. The data collection information of the local training data of the distributed nodes that have been determined to be used for generating a global model parameter may be broadcast by the distributed nodes themselves or transmitted to the central processing apparatus AP and broadcast by the central processing apparatus AP.

In some embodiments, the data collection information may include the collection time of the local training data, and the specific correlation requirement may be set such that the time interval between collection times of the local training data of the distributed node $UE_1$ and the local training data of other distributed nodes that have been determined to be used for generating the global model parameter is greater than a specific time interval threshold.

In some embodiments, data collection information may include node location of a distributed node, and a specific correlation requirement may be set such that distances between the distributed node $UE_1$ and other distributed nodes that have been determined to be used for generating a global model parameter are greater than a specific distance threshold. Furthermore, the specific correlation requirement can also be set such that the distributed node $UE_1$ is outside associated exclusive regions of other distributed nodes that have been determined to be used for generating a global model parameter. The specific distance threshold or exclusive regions may be preset, or broadcast by the distributed nodes that have been determined to be used for generating the global model parameter or the central processing apparatus AP, or determined by the distributed node $UE_1$ according to current network conditions.

If it is determined in step S882 that the specific correlation requirement is met, the process 880 proceeds to step S884. In step S884, the distributed node $UE_1$ acquires channel resources for transmitting a local model parameter to the central processing apparatus AP in a competitive manner, for example through carrier sensing, and determines whether channel resources are successfully acquired.

In some embodiments, the distributed node $UE_1$ can adjust parameters used for acquiring channel resources (for example, energy detection threshold, backoff window size) according to one or both of its network performance parameter and local training performance parameter. For example, when the network performance and/or local training performance is good (for example, higher than respective performance threshold), the distributed node $UE_1$ can increase its probability of success in acquiring channel resources by adjusting the parameters for acquiring channel resources (for example, increasing its energy detection threshold or reducing backoff window size). Therefore, distributed nodes with good network performance and/or good local training performance have a higher probability of uploading local model parameters.

In some embodiments, the central processing apparatus AP broadcasts an instruction to stop uploading after the number of the determined distributed nodes used for generating a global model parameter reach a first predetermined number. After receiving the instruction to stop uploading from the central processing apparatus AP, the distributed node $UE_1$ stops acquiring channel resources for uploading the local model parameter to the central processing apparatus.

In some embodiments, the distributed node $UE_1$ may determine by itself the number of distributed nodes that have been determined to generate the global model parameter. For example, the number is increased by 1 each time the distributed node $UE_1$ receives a broadcast from a distributed node determined to generate the global model parameter. After the number is equal to or greater than the first predetermined number, the distributed node $UE_1$ stops acquiring channel resources for transmitting the local model parameter to the central processing apparatus AP. The first predetermined number can be preset in the distributed node $UE_1$, or broadcast by the central processing apparatus AP.

If channel resources are successfully acquired in step S884, the process 880 proceeds to step S886. In step S886, the distributed node $UE_1$ determines that it will be used to generate the global model parameter. In step S888, the distributed node $UE_1$ transmits its local model parameter to the central processing apparatus AP through the acquired channel resources. In step S890, the central processing apparatus AP determines the distributed node $UE_1$ as a distributed node for generating the global model parameter in response to receiving the local model parameter of the distributed node $UE_1$.

Although not shown in FIG. 8, after the distributed node $UE_1$ determines that it will be used to generate the global model parameter, it can broadcast data collection information of its local training data, or transmit the data collection information to the central processing apparatus AP and broadcast by the central processing apparatus AP, to be used for determining the next distributed node for generating the global model parameter in a distributed manner.

The technical solutions of the embodiments of the present disclosure can be applied to an intelligent driving scenario. In the intelligent driving scenario, the vehicle uses an artificial intelligence model to judge whether there are pedestrians crossing a crosswalk at an intersection and the status of traffic lights, and adopt a braking strategy. Local training data for each vehicle is the intersection condition data collected by a vehicle camera and a braking annotation given by a human (e.g., a driver or an observer at the intersection) or a supervisory processing apparatus. The braking annotation indicates whether braking is needed under the current intersection condition, which can be given by a person by observing the intersection condition, or obtained by the supervisory processing apparatus inputting the intersection condition data captured by a camera at the traffic light into a trained artificial intelligence model. During the local training process, each vehicle can take the reciprocal of the difference between the braking judgment given by the local model based on the intersection condition data and the braking annotation given by the human or supervisory processing apparatus under several intersection conditions as the objective function, and update the local model using an algorithm.

In some embodiments of the present disclosure, each vehicle can be used as a distributed node to upload local training data to a central processing apparatus for federated learning. Since local training data of different vehicles at the same intersection may be correlated, vehicles with low correlation may be selected to upload local model parameters to generate a global model parameter based on collection times of local training data of vehicles and/or vehicle locations. In addition, vehicles with good network performance and/or local training performance may be selected to upload local model parameters to generate a global model parameter based on network performance parameters and/or local training performance parameters of vehicles. The central processing unit distributes the generated global model parameter to each vehicle. Each vehicle processes intersection condition data collected by vehicle cameras according to a model based on the global model parameter to determine whether braking is needed.

3. Simulation Results

In a case that local training data of a distributed node originates from its sampling of surrounding environment, the correlation between local training data of a plurality of distributed nodes is related to the distance between them. The farther the distance between the distributed nodes, the lower the correlation between the local training data.

Figure 9:
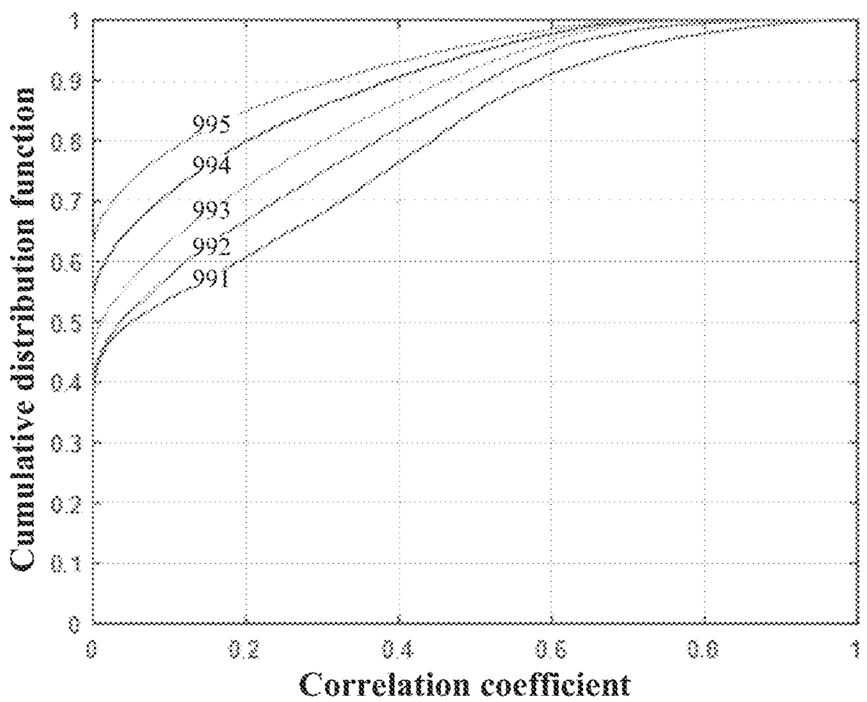
FIG. 9 is a schematic diagram illustrating the correlation between local training data of a distributed node and its neighbor nodes.

FIG. 9 is a schematic diagram illustrating the correlation between local training data of a distributed node and its neighbor nodes. In FIG. 9, the abscissa represents the correlation coefficient between neighbor nodes, and the ordinate represents the cumulative distribution function of the correlation between any distributed node and local training data of its neighbor nodes. Curve 991 represents the correlation between any distributed node and its nearest neighbor node, curve 992 represents the correlation between any distributed node and its second nearest neighbor node, curve 993 represents the correlation between any distributed node and its third nearest neighbor node, the curve 994 represents the correlation between any distributed node and its fourth nearest neighbor node, and the curve 995 represents the correlation between any distributed node and its fifth nearest neighbor node. As shown in FIG. 9, as the distance between neighbor nodes increases, their correlation decreases.

Figure 10:
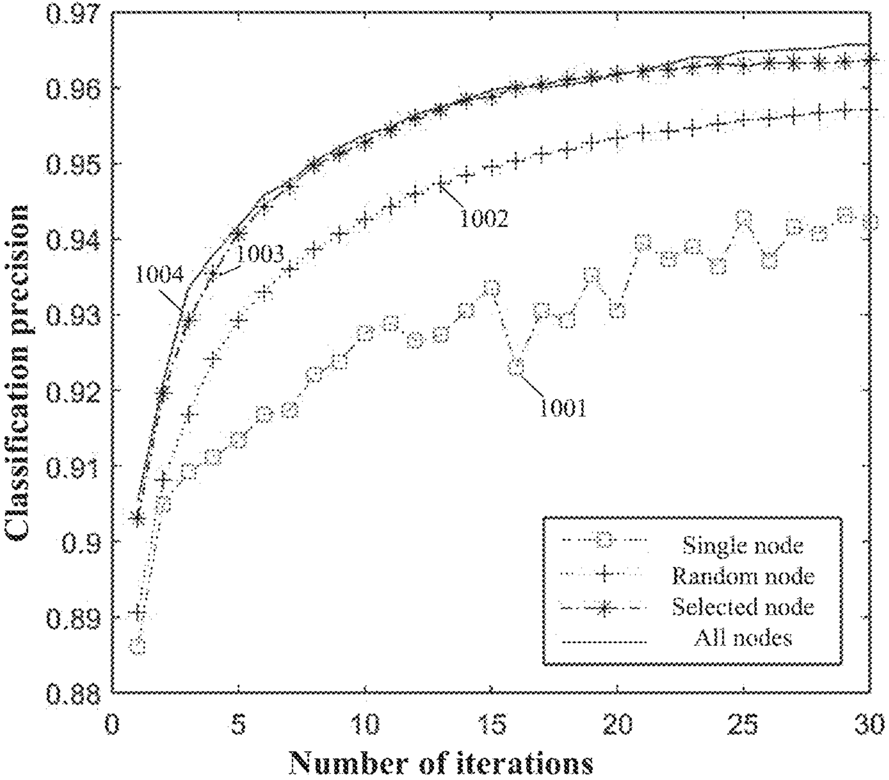
FIG. 10 is a schematic diagram illustrating the classification precision of a federated learning model obtained by using different node selection strategies.

FIG. 10 is a schematic diagram illustrating the classification precision of a federated learning model obtained by using different node selection strategies. In FIG. 10, the abscissa represents the number of iterations of the federated learning model, and the ordinate represents the classification precision of using the generated federated learning model for classification. Curve 1001 represents the classification precision of the federated learning model when the federated learning model is generated using local training data of a randomly selected single node, curve 1002 represents the classification precision of the federated learning model when the federated learning model is generated using local training data of the first predetermined number of randomly selected nodes, the curve 1003 represents the classification precision of the federated learning model when the federated learning model is generated using local training data of the first predetermined number of nodes selected according to the disclosed technology, and the curve 1004 represents the classification precision of the federated learning model when the federated learning model is generated using local training data of all nodes. As shown in FIG. 10, the classification precision of the federated learning model when the federated learning model is generated using local training data of the first predetermined number of nodes selected according to the technology of the present disclosure is similar to that of the federated learning model when the federated learning model is generated using local training data of all nodes. Therefore, the disclosed technology can generate a federated learning model efficiently without significantly reducing the classification precision of the federated learning model.

4. Application Examples

The technology of the present disclosure can be applied to various products. For example, both base stations and user devices can be implemented as various types of computing devices.

Furthermore, a base station can be implemented as any type of evolved Node B (eNB), gNB or TRP (Transmit Receive Point), such as a macro eNB/gNB and a small eNB/gNB. The small eNB/gNB may be an eNB/gNB that covers a cell smaller than a macro cell, such as a pico eNB/gNB, a micro eNB/gNB, and a home (femto) eNB/gNB. Alternatively, the base station can be implemented as any other type of base station, such as a NodeB and a Base Transceiver Station (BTS). The base station may include: a main body (also referred to as a base station device) configured to control wireless communication; and one or more remote radio heads (RRHs) disposed at places different from the main body. In addition, various types of terminals to be described below can operate as a base station by temporarily or semi-permanently performing base station functions.

In addition, a user device can be implemented as a mobile terminal (such as a smart phone, a tablet personal computer (PC), a notebook PC, a portable game terminal, a portable/dongle type mobile router, and a digital camera) or a vehicle-mounted terminal (such as a car navigation device). The user devices can also be implemented as a terminal performing machine-to-machine (M2M) communication (also referred to as a machine type communication (MTC) terminal). In addition, the user device may be a wireless communication module (such as an integrated circuit module including a single wafer) mounted on each of above terminals.

3-1. Application Examples Regarding Computing Devices

Figure 11:
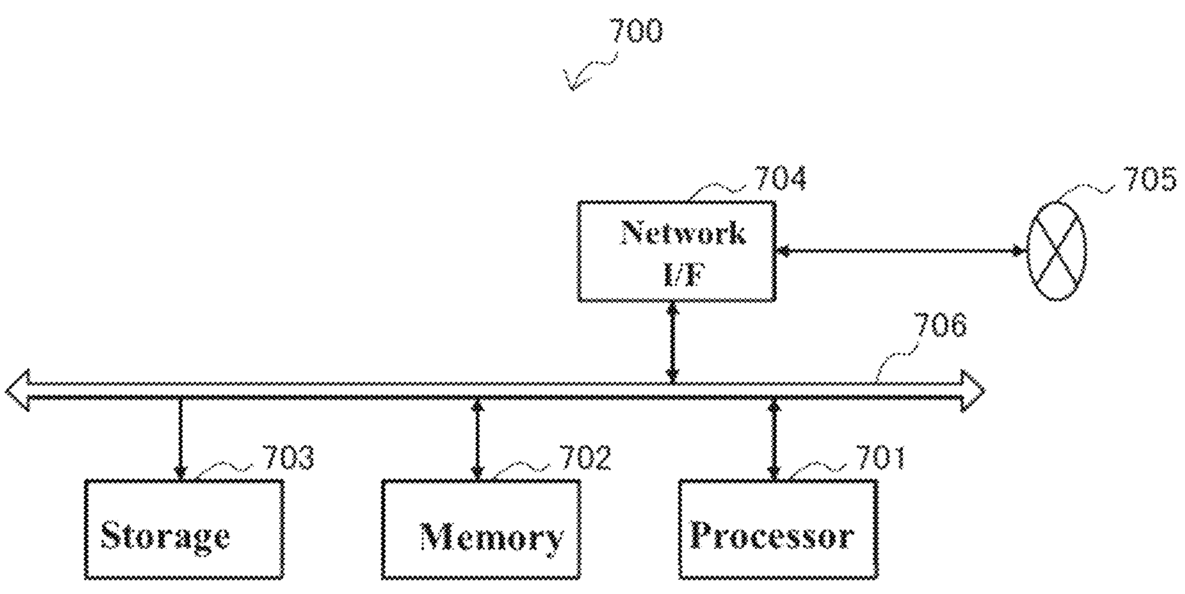
FIG. 11 is a block diagram illustrating an example of a schematic configuration of a computing device to which the technology of the present disclosure can be applied.

FIG. 11 is a block diagram illustrating an example of a schematic configuration of a computing device 700 to which the technology of the present disclosure can be applied. The computing device 700 includes a processor 701, a memory 702, a storage 703, a network I/F 704 and a bus 706.

The processor 701 may be, for example, a central processing unit (CPU) or a digital signal processor (DSP), and controls the functions of the server 700. The memory 702 includes a random access memory (RAM) and a read only memory (ROM), and stores data and programs executed by the processor 701. The storage 703 can include a storage medium, such as a semiconductor memory and a hard disk.

The network I/F 704 is a wired communication I/F for connecting the server 700 to the wired communication network 705. The wired communication network 705 can be a core network such as an evolved packet core network (EPC) or a packet data network (PDN) such as the Internet.

The bus 706 connects the processor 701, the memory 702, the storage 703, and the network I/F 704 to each other. The bus 706 can include two or more buses (such as a high-speed bus and a low-speed bus) each having a different speed.

3-2. Application Examples Regarding Base Stations

First Application Example

Figure 12:
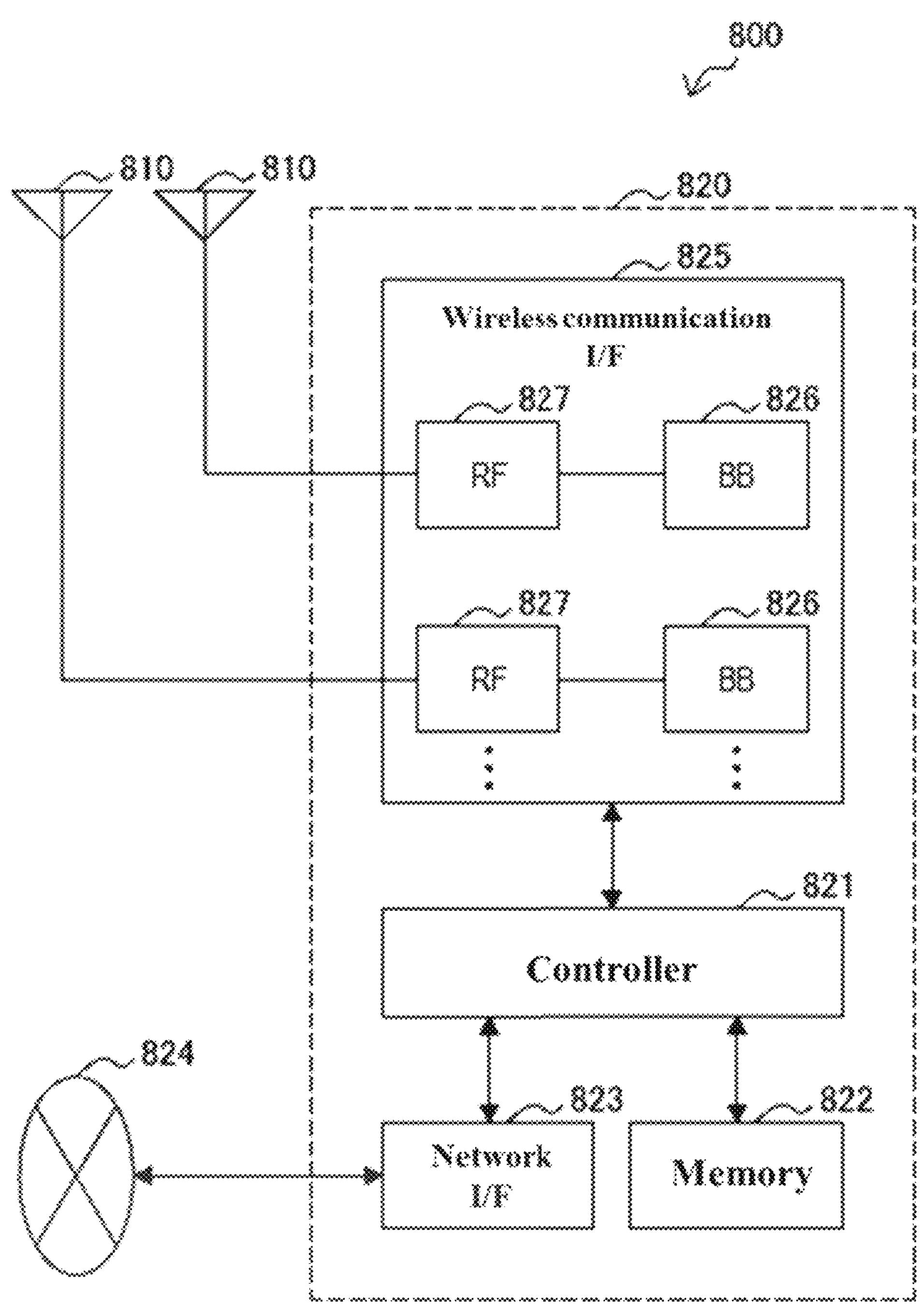
FIG. 12 is a block diagram illustrating a first example of a schematic configuration of a gNB to which the technology of the present disclosure can be applied.

FIG. 12 is a block diagram illustrating a first example of a schematic configuration of a gNB to which the technology of the present disclosure can be applied. The gNB 800 includes one or more antennas 810 and a base station device 820. The base station device 820 and each antenna 810 may be connected to each other via an RF cable.

Each of the antennas 810 includes a single or a plurality of antenna elements (such as a plurality of antenna elements included in a Multiple Input Multiple Output (MIMO) antenna), and is used for the base station device 820 to transmit and receive wireless signals. As shown in FIG. 12, gNB 800 may include a plurality of antennas 810. For example, the plurality of antennas 810 may be compatible with a plurality of frequency bands used by the gNB 800. Although FIG. 12 illustrates an example in which the gNB 800 includes a plurality of antennas 810, the gNB 800 may also include a single antenna 810.

The base station device 820 includes a controller 821, a memory 822, a network I/F 823, and a wireless communication I/F 825.

The controller 821 may be, for example, a CPU or a DSP, and operates various functions of higher layers of the base station device 820. For example, the controller 821 generates a data packet from data in signals processed by the wireless communication I/F 825, and transfers the generated packet via the network I/F 823. The controller 821 may bundle data from a plurality of base band processors to generate the bundled packet and transfer the generated bundled packet. The controller 821 may have logic functions of performing control such as radio resource control, radio bearer control, mobility management, admission control, and scheduling. This control may be performed in conjunction with an gNB or a core network node in the vicinity. The memory 822 includes RAM and ROM, and stores a program that is executed by the controller 821, and various types of control data (such as a terminal list, transmission power data, and scheduling data).

The network I/F 823 is a communication I/F for connecting the base station device 820 to a core network 824. The controller 821 may communicate with a core network node or another gNB via the network I/F 823. In that case, the gNB 800, and the core network node or the other gNB may be connected to each other through a logical I/F (such as an S1 interface and an X2 interface). The network I/F 823 may also be a wired communication I/F or a wireless communication I/F for radio backhaul. If the network I/F 823 is a wireless communication I/F, the network I/F 823 may use a higher frequency band for wireless communication than a frequency band used by the wireless communication I/F 825.

The wireless communication I/F 825 supports any cellular communication scheme such as Long Term Evolution (LTE) and LTE-Advanced, and provides radio connection to terminal positioned in a cell of the gNB 800 via the antenna 810. The wireless communication I/F 825 may typically include, for example, a baseband (BB) processor 826 and an RF circuit 827. The BB processor 826 may perform, for example, encoding/decoding, modulation/demodulation, and multiplexing/demultiplexing, and performs various types of signal processing of layers (such as L1, medium access control (MAC), radio link control (RLC), and packet data convergence protocol (PDCP)). The BB processor 826 may have a part or all of the above-described logical functions Instead of the controller 821. The BB processor 826 may be a memory that stores a communication control program, or a module that includes a processor and a related circuitry configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives wireless signals via the antenna 810.

As illustrated in FIG. 12, the wireless communication I/F 825 may include a plurality of BB processors 826. For example, the plurality of BB processors 826 may be compatible with a plurality of frequency bands used by the gNB 800. As illustrated in FIG. 12, the wireless communication I/F 825 may include a plurality of RF circuits 827. For example, the plurality of RF circuits 827 may be compatible with a plurality of antenna elements. Although FIG. 12 illustrates an example in which the wireless communication I/F 825 includes a plurality of BB processors 826 and a plurality of RF circuits 827, the wireless communication I/F 825 may also include a single BB processor 826 or a single RF circuit 827.

Second Application Example

Figure 13:
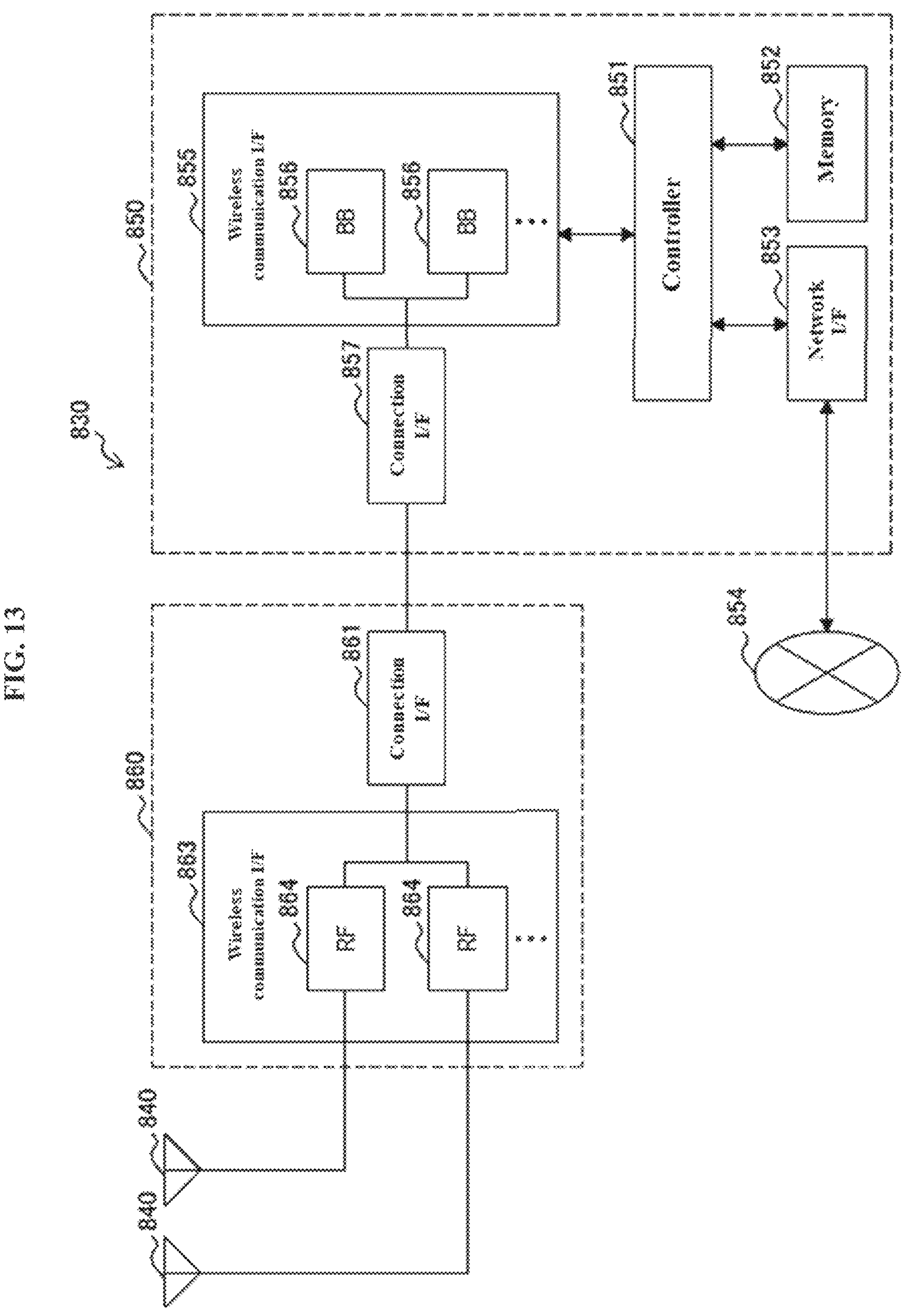
FIG. 13 is a block diagram illustrating a second example of a schematic configuration of a gNB to which the technology of the present disclosure can be applied.

FIG. 13 is a block diagram illustrating a second example of a schematic configuration of a gNB to which the technology of the present disclosure can be applied. The gNB 830 includes one or more antennas 840, a base station device 850, and an RRH 860. The RRH 860 and each antenna 840 may be connected to each other via an RF cable. The base station device 850 and the RRH 860 may be connected to each other via a high speed line such as an optic fiber cable.

Each of the antennas 840 includes a single or a plurality of antenna elements (such as a plurality of antenna elements included in a MIMO antenna) and is used for the RRH 860 to transmit and receive wireless signals. As illustrated in FIG. 13, the gNB 830 may include a plurality of antennas 840. For example, the plurality of antennas 840 may be compatible with a plurality of frequency bands used by the gNB 830. Although FIG. 13 illustrates an example in which the gNB 830 includes a plurality of antennas 840, the gNB 830 may also include a single antenna 840.

The base station device 850 includes a controller 851, a memory 852, a network I/F 853, a wireless communication I/F 855, and a connection I/F 857. The controller 851, memory 852, and network I/F 853 are the same as the controller 821, memory 822, and network I/F 823 described with reference to FIG. 12.

The wireless communication I/F 855 supports any cellular communication scheme (such as LTE and LTE-Advanced) and provides wireless communication to a terminal positioned in a sector corresponding to the RRH 860 via the RRH 860 and the antenna 840. The wireless communication I/F 855 may typically include, for example, a BB processor

856. The BB processor 856 is the same as the BB processor 826 described with reference to FIG. 12, except that the BB processor 856 is connected to the RF circuit 864 of the RRH 860 via the connection I/F 857. The wireless communication I/F 855 may include the plurality of BB processors 856, as illustrated in FIG. 13. For example, the plurality of BB processors 856 may be compatible with a plurality of frequency bands used by the gNB 830. Although FIG. 13 illustrates the example in which the wireless communication I/F 855 includes the plurality of BB processors 856, the wireless communication I/F 855 may also include a single BB processor 856.

The connection I/F 857 is an interface for connecting the base station device 850 (wireless communication I/F 855) to the RRH 860. The connection I/F 857 may also be a communication module for communicating in the above-described high speed line that connects the base station device 850 (wireless communication I/F 855) to the RRH 860.

The RRH 860 includes a connection I/F 861 and a wireless communication I/F 863.

The connection I/F 861 is an interface for connecting the RRH 860 (wireless communication I/F 863) to the base station device 850. The connection I/F 861 may also be a communication module for communication in the above-described high speed line.

The wireless communication I/F 863 transmits and receives wireless signals via the antenna 840. Wireless communication I/F 863 may typically include, for example, the RF circuit 864. The RF circuit 864 may include, for example, a mixer, a filter, and an amplifier, and transmits and receives wireless signals via the antenna 840. The wireless communication I/F 863 may include a plurality of RF circuits 864, as illustrated in FIG. 13. For example, the plurality of RF circuits 864 may support a plurality of antenna elements. Although FIG. 13 illustrates the example in which the wireless communication I/F 863 includes the plurality of RF circuits 864, the wireless communication I/F 863 may also include a single RF circuit 864.

3-3. Application Examples Regarding Terminal Devices

First Application Example

Figure 14:
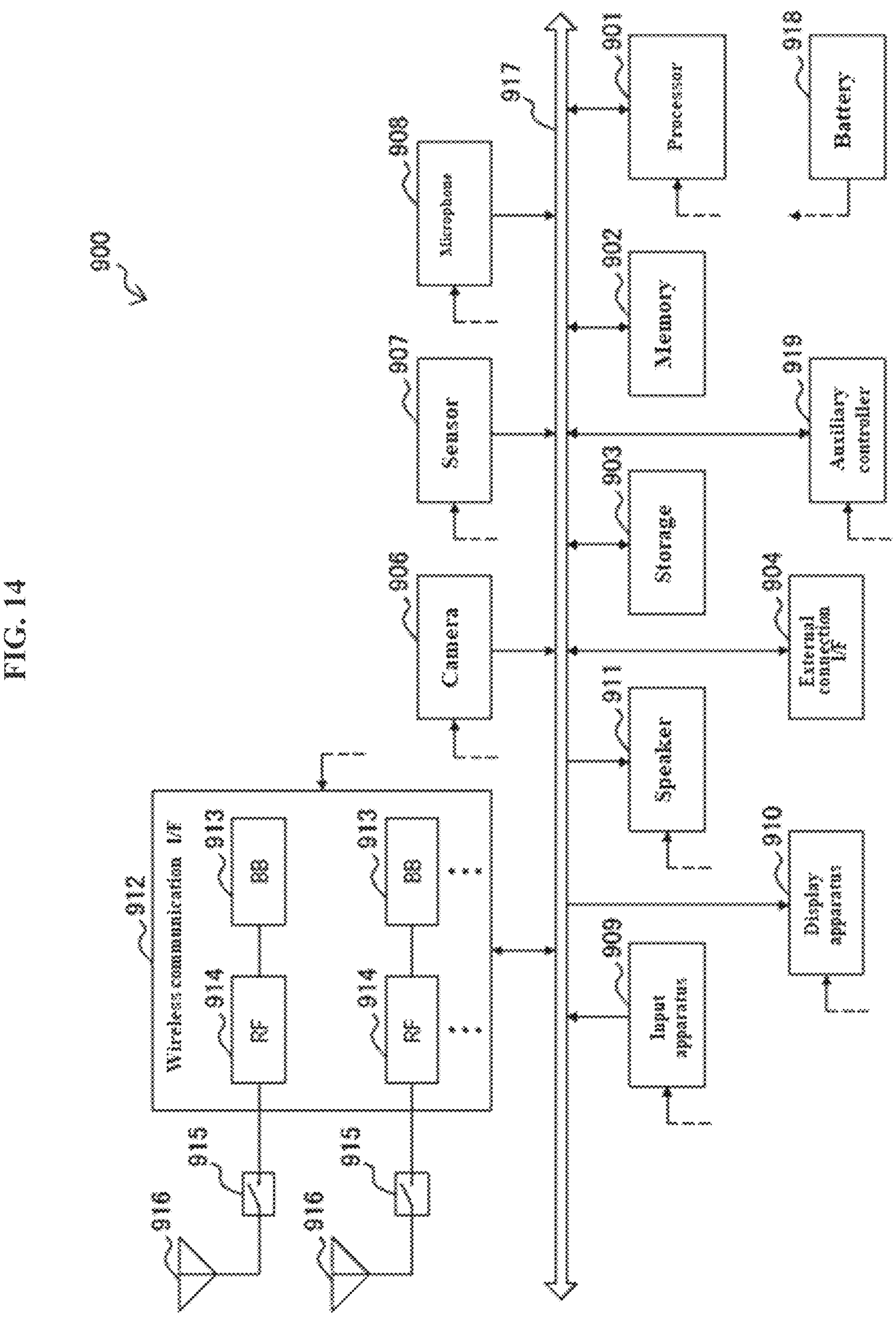
FIG. 14 is a block diagram illustrating an example of a schematic configuration of a smart phone to which the technology of the present disclosure can be applied.

FIG. 14 is a block diagram illustrating an example of a schematic configuration of a smart phone 900 to which the technology of the present disclosure may be applied. The smart phone 900 includes a processor 901, a memory 902, a storage 903, an external connection I/F 904, a camera 906, a sensor 907, a microphone 908, an input apparatus 909, a display device 910, a speaker 911, a wireless communication I/F 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smart phone 900. The memory 902 includes RAM and ROM, and stores data and a program that is executed by the processor 901. The storage 903 may include a storage medium such as a semiconductor memory and a hard disk. The external connection I/F 904 is an interface for connecting an external device such as a memory card and a universal serial bus (USB) device to the smart phone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smart phone 900 to audio signals. The input apparatus 909 includes, for example, a touch sensor configured to detect touch onto a screen of the display apparatus 910, a keypad, a keyboard, a button, or a switch, and receives an operation or an information input from a user. The display apparatus 910 includes a screen such as a liquid crystal display (LCD) and an organic light-emitting diode (OLED) display, and displays an output image of the smart phone 900. The speaker 911 converts audio signals that are output from the smart phone 900 to sounds.

The wireless communication I/F 912 supports any cellular communication scheme (such as LTE and LTE-Advanced) and performs wireless communication. The wireless communication I/F 912 may typically include, for example, a BB processor 913 and an RF circuit 914. The BB processor 913 may perform, for example, encoding/decoding, modulation/demodulation, and multiplexing/demultiplexing, and performs various types of signal processing for wireless communication. Meanwhile, the RF circuit 914 may include, for example, a mixer, a filter, and an amplifier, and transmits and receives wireless signals via the antenna 916. The wireless communication I/F 912 may be one chip module that has the BB processor 913 and the RF circuit 914 integrated thereon. The wireless communication I/F 912 may include a plurality of BB processors 913 and a plurality of RF circuits 914, as illustrated in FIG. 14. Although FIG. 14 illustrates the example in which the wireless communication I/F 912 includes a plurality of BB processors 913 and a plurality of RF circuits 914, the wireless communication I/F 912 may also include a single BB processor 913 or a single RF circuit 914.

Furthermore, in addition to a cellular communication scheme, the wireless communication I/F 912 may support another type of wireless communication scheme such as a short-distance wireless communication scheme, a near field communication scheme, and a wireless local area network (LAN) scheme. In that case, the wireless communication I/F 912 may include the BB processor 913 and the RF circuit 914 for each wireless communication scheme.

Each of the antenna switches 915 switches connection destinations of the antennas 916 among multiple circuits (such as circuits for different wireless communication schemes) included in the wireless communication I/F 912.

Each of the antennas 916 includes a single or a plurality of antenna elements (such as a plurality of antenna elements included in an MIMO antenna), and is used for the wireless communication I/F 912 to transmit and receive wireless signals. The smart phone 900 may include a plurality of antennas 916, as illustrated in FIG. 14. Although FIG. 14 illustrates the example in which the smart phone 900 includes a plurality of antennas 916, the smart phone 900 may also include a single antenna 916.

Furthermore, the smart phone 900 may include the antenna 916 for each wireless communication scheme. In that case, the antenna switches 915 may be omitted from the configuration of the smart phone 900.

The bus 917 connects the processor 901, the memory 902, the storage 903, the external connection I/F 904, the camera 906, the sensor 907, the microphone 908, the input apparatus 909, the display apparatus 910, the speaker 911, the wireless communication I/F 912, and the auxiliary controller 919 to each other. The battery 918 supplies power to blocks of the smart phone 900 illustrated in FIG. 14 via feeder lines, which are partially shown as dashed lines in the figure. The auxiliary controller 919 operates a minimum necessary function of the smart phone 900, for example, in a sleep mode.

Second Application Example

FIG. 15 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data I/F 926, a content player 927, a storage medium I/F 928, an input apparatus 929, a display apparatus 930, a speaker 931, and a wireless communication I/F 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores data and a program that is executed by the processor 921.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and a barometric sensor. The data I/F 926 is connected to, for example, an in-vehicle network 941 via a terminal that is not shown, and acquires data (such as vehicle speed data) generated by the vehicle.

The content player 927 reproduces content stored in a storage medium (such as a CD and a DVD) that is inserted into the storage medium. I/F 928. The input apparatus 929 includes, for example, a touch sensor configured to detect touch onto a screen of the display apparatus 930, a button, or a switch, and receives an operation or an information input from a user. The display apparatus 930 includes a screen such as a LCD or an OLED display, and displays an image of the navigation function or content that is reproduced. The speaker 931 outputs sounds of the navigation function or the content that is reproduced.

The wireless communication I/F 933 supports any cellular communication scheme (such as LTE and LTE-Advanced) and performs wireless communication. The wireless communication I/F 933 may typically include, for example, a BB processor 934 and an RF circuit 935. The BB processor 934 may perform, for example, encoding/decoding, modulating/demodulating, and multiplexing/demultiplexing, and performs various types of signal processing for wireless communication. Meanwhile, the RF circuit 935 may include, for example, a mixer, a filter, and an amplifier, and transmits and receives wireless signals via the antenna 937. The wireless communication I/F 933 may also be one chip module having the BB processor 934 and the RF circuit 935 integrated thereon. The wireless communication I/F 933 may include a plurality of BB processors 934 and a plurality of RF circuits 935, as illustrated in FIG. 15. Although FIG. 15 illustrates the example in which the wireless communication I/F 933 includes a plurality of BB processors 934 and a plurality of RF circuits 935, the wireless communication I/F 933 may also include a single BB processor 934 or a single RF circuit 935.

Furthermore, in addition to a cellular communication scheme, the wireless communication I/F 933 may support another type of wireless communication scheme, such as a short-distance wireless communication scheme, a near-field communication scheme, and a wireless LAN scheme. In that case, the wireless communication I/F 933 may include the BB processor 934 and the RF circuit 935 for each wireless communication scheme.

Each of the antenna switches 936 switches connection destinations of the antennas 937 among multiple circuits (such as circuits for different wireless communication schemes) included in the wireless communication I/F 933.

Each of the antennas 937 includes a single or a plurality of antenna elements (such as a plurality of antenna elements included in an MIMO antenna) and is used for the wireless communication I/F 933 to transmit and receive wireless signals. The car navigation device 920 may include a plurality of antennas 937, as illustrated in FIG. 15. Although FIG. 15 illustrates the example in which the car navigation device 920 includes a plurality of antennas 937, the car navigation device 920 may also include a single antenna 937.

Furthermore, the car navigation device 920 may include the antenna 937 for each wireless communication scheme. In that case, the antenna switches 936 may be omitted from the configuration of the car navigation device 920.

The battery 938 supplies power to blocks of the car navigation device 920 illustrated in FIG. 15 via feeders lines that are partially shown as dashed lines in the figure. The battery 938 accumulates power supplied from the vehicle.

The technology of the present disclosure may also be realized as an in-vehicle system (or a vehicle) 940 including one or more blocks of the car navigation device 920, the in-vehicle network 941, and a vehicle module 942. The vehicle module 942 generates vehicle data such as vehicle speed, engine speed, and trouble information, and outputs the generated data to the in-vehicle network 941.

The various illustrative blocks and components described in connection with the present disclosure may be implemented or performed with a general purpose processor, a digital signal processor (DSP), an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, and/or state machine. A processor may also be implemented as a combination of computing devices, e.g., a combination of a DSP and a microprocessor, a plurality of microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on a non-transitory computer readable medium or transmitted as one or more instructions or code on a non-transitory computer readable medium. Other examples and implementations are within the scope and spirit of the disclosure and the appended claims. For example, in view of the nature of the software, the functions described above may be performed using software executed by a processor, hardware, firmware, hardwired, or any combination of thereof. Features that implement the functions may also be physically placed at various locations, including being distributed such that portion of the functionality are realized at different physical locations.

Furthermore, the disclosure of components contained within or separate from other components should be considered as exemplary, as various other architectures may potentially be realized to achieve the same functionality, including incorporation of all, a majority part of, and/or some of the elements as one or more single structures or a portion of a separated structure.

Non-transitory computer readable media can be any available non-transitory media that may be accessed by a general purpose or special purpose computer. By way of example and not limitation, a non-transitory computer readable medium may comprise RAM, ROM, EEPROM, flash memory, CD-ROM, DVD or other optical disk storage, disk storage or other magnetic storage device, or any other medium that can be used to carry or store desired program code component in the form of instruction or data structure and that can be accessed by a general purpose or special purpose computer or a general purpose or special purpose processor.

The foregoing description of the disclosure is provided to enable a person skilled in the art to make or use the disclosure. The various modifications of the present disclosure will be apparent to those skilled in the art, and the general principles defined herein may be applied to other variations without departing from the scope of the present disclosure. Accordingly, the present disclosure is not limited to the examples and designs described herein, rather, it corresponds to the broadest scope consistent with the disclosed principles and novel features.

Embodiments of the present disclosure also include:

1. An electronic device for federated learning at a central processing apparatus, comprises a processing circuitry configured to:

determine a group of distributed nodes for generating a global model parameter among a plurality of distributed nodes, wherein the correlation between local training data of the group of distributed nodes meets a specific correlation requirement; and generate the global model parameter based on local model parameters of the group of distributed nodes, wherein the local model parameters are generated by the group of distributed nodes based on respective local training data thereof.

2. The electronic device of item 1, wherein the specific correlation requirement includes:

time intervals between collection times of the local training data of the group of distributed nodes being greater than a specific time interval threshold.

3. The electronic device of item 1, wherein the specific correlation requirement includes:

distances between node locations of the group of distributed nodes being greater than a specific distance threshold.

4. The electronic device of item 1, wherein the specific correlation requirement includes:

each distributed node of the group of distributed nodes being outside associated exclusive regions of the remaining distributed nodes of the group of distributed nodes, wherein the associated exclusive region of each distributed node is defined by a region in which the distance from each point of the region to the distributed node is less than an exclusive distance or by a set of a second predetermined number of distributed nodes closest in distance to the distributed node.

5. The electronic device of item 1, wherein the specific correlation requirement includes:

generative models for the local training data of the group of distributed nodes being different.

6. The electronic device of item 1, wherein the specific correlation requirement includes:

data sources of the local training data of the group of distributed nodes being different.

7. The electronic device of item 1, wherein determining the group of distributed nodes for generating a global model parameter among the plurality of distributed nodes comprises:

acquiring data collection information of the local training data of the plurality of distributed nodes, the data collection information being able to be used to determine the correlation between the local training data of the plurality of distributed nodes;

selecting the group of distributed nodes for generating a global model parameter among the plurality of distributed nodes based on the data collection information of the local training data of the plurality of distributed nodes.

8. The electronic device of item 7, wherein, the data collection information includes one or more of collection time of the local training data, node location, generative model, and data source.

9. The electronic device of item 7, wherein the processing circuitry is further configured to:

acquire network performance parameters of the plurality of distributed nodes;

select the group of distributed nodes for generating the global model parameter from the plurality of distributed nodes based on the network performance parameters of the plurality of distributed nodes, wherein the network performance parameters of the group of distributed nodes meet a specific network performance requirement.

10. The electronic device of item 7, wherein the processing circuitry is further configured to:

acquire local training performance parameters of the plurality of distributed nodes;

select the group of distributed nodes for generating the global model parameter among the plurality of distributed nodes based on the local training performance parameters of the plurality of distributed nodes, wherein the local training performance parameters of the group of distributed nodes meet a specific local training performance requirement.

11. The electronic device of item 1, wherein determining the group of distributed nodes for generating a global model parameter among the plurality of distributed nodes comprises:

receiving local model parameters from distributed nodes of the plurality of distributed nodes, after receiving local model parameters of a first predetermined number of distributed nodes, determining the first predetermined number of distributed nodes as the group of distributed nodes for generating the global model parameter among the plurality of distributed nodes.

12. An electronic device for federated learning, comprises a processing circuitry configured to:

determine that a specific distributed node will be used to generate a global model parameter, wherein the correlation between local training data of the specific distributed node and local training data of other distributed nodes for generating the global model parameter meets a specific correlation requirement;

transmit a local model parameter of the specific distributed node to a central processing apparatus, wherein the local model parameter is generated by the specific distributed node based on its local training data.

13. The electronic device of item 12, wherein determining that the specific distributed node will be used to generate the global model parameter comprises:

transmitting data collection information of the local training data of the specific distributed node to the central processing apparatus, the data collection information being able to be used to determine the correlation between the local training data of the specific distributed node and local training data of other distributed nodes that have been determined to be used to generate the global model the parameter; and determining that the specific distributed node will be used to generate the global model parameter based on an instruction to upload the local model parameter from the central processing apparatus.

14. The electronic device of item 12, wherein determining that the specific distributed node will be used to generate the global model parameter comprises:

determining the correlation between the local training data of the specific distributed node and the local training data of other distributed nodes in the data that have been determined to be used to generate the global model parameter meets a specific correlation requirement, based on the data collection information of the local training data of the specific distributed node and other distributed nodes that have been determined to be used to generate the global model parameter;

acquiring channel resources for transmitting a local model parameter to the central processing apparatus; and determining that the specific distributed node will be used to the generate global model parameter after successfully acquiring the channel resources.

15. The electronic device of item 14, wherein, the data collection information includes node locations of distributed nodes, and the specific correlation requirement includes: the specific distributed node being outside associated exclusive regions of the other distributed nodes that have been determined to be used to generate the global model parameter, wherein the associated exclusive region of a distributed node is defined by a region in which the distance from each point of the region to the distributed node is less than an exclusive distance or by a set of a second predetermined number of distributed nodes closest in distance to the distributed node.

16. The electronic device of item 14, wherein the processing circuitry is further configured to:

adjust a parameter for acquiring channel resources according to one or both of a network performance parameter and a local training performance parameter of the specific distributed node.

17. The electronic device of item 14, wherein the processing circuitry is further configured to:

stop acquiring channel resources for transmitting the local model parameter to the central processing apparatus after receiving an instruction to stop uploading from the central processing apparatus.

18. The electronic device of item 14, wherein the processing circuitry is further configured to:

determine the number of other distributed nodes that have been determined to be used to generate the global model parameter; and stop acquiring channel resources for transmitting the local model parameter to the central processing apparatus after the number is equal to or greater than a first predetermined number.

19. A method for federated learning at a central processing apparatus, comprises:

determining a group of distributed nodes for generating a global model parameter among a plurality of distributed nodes, wherein the correlation between local training data of the group of distributed nodes meets a specific correlation requirement; and generating the global model parameter based on local model parameters of the group of distributed nodes, wherein the local model parameters are generated by the group of distributed nodes based on respective local training data thereof.

20. A method for federated learning at a specific distributed node, comprises:

determining that the specific distributed node will be used to generate a global model parameter, wherein the correlation between local training data of the specific distributed node and local training data of other distributed nodes that have been determined to be used to generate the global model parameter meets a specific correlation requirement;

transmitting a local model parameter of the specific distributed node to a central processing apparatus, wherein the local model parameter is generated by the specific distributed node based on its local training data.

21. A non-transitory computer readable storage medium having instructions stored thereon, which, when executed by a processor, cause the processor to perform the method of item 19 or 20.

22. An apparatus for federated learning comprising components for performing various steps of the method of item 19 or 20.

What is claimed is:

1. An electronic device for federated learning, comprising:

a transmitter; and a processing circuitry configured to:

determine that a specific distributed node will be used to generate a global model parameter, wherein a correlation between local training data of the specific distributed node and local training data of other distributed nodes for generating the global model parameter meets a specific correlation requirement; and control the transmitter to transmit a local model parameter of the specific distributed node to a central processing apparatus, wherein the local model parameter is generated by the specific distributed node based on its local training data, and control the transmitter to transmit data collection information of the local training data of the specific distributed node to the central processing apparatus, wherein the data collection information is information used by the central processing apparatus to determine the correlation between the local training data of the specific distributed node and local training data of other distributed nodes that have been determined to be used to generate the global model the parameter, wherein the data collection information includes node locations of distributed nodes, wherein the specific correlation requirement includes the specific distributed node being outside associated exclusive regions of the other distributed nodes that have been determined to be used to generate the global model parameter, and wherein an associated exclusive region of a distributed node is defined by:

a region in which the distance from each point of the region to the distributed node is less than an exclusive distance, or a set of a second predetermined number of distributed nodes closest in distance to the distributed node.

2. The electronic device of claim 1, wherein the processing circuitry is further configured to:

adjust a parameter for acquiring channel resources according to one or both of a network performance parameter and a local training performance parameter of the specific distributed node.

3. The electronic device of claim 1, wherein the processing circuitry is further configured to:

control the transmitter to stop acquiring channel resources for transmitting the local model parameter to the central processing apparatus after receiving an instruction to stop uploading from the central processing apparatus.

4. The electronic device of claim 1, wherein the processing circuitry is further configured to:

determine a number of the other distributed nodes that have been determined to be used to generate the global model parameter; and control the transmitter to stop acquiring channel resources for transmitting the local model parameter to the central processing apparatus after the number is equal to or greater than a first predetermined number.

5. A method for federated learning performed by an electronic device that comprises a processing circuitry and a transmitter, the method comprising:

determining that a specific distributed node will be used to generate a global model parameter, wherein a correlation between local training data of the specific distributed node and local training data of other distributed nodes for generating the global model parameter meets a specific correlation requirement; and controlling the transmitter to transmit a local model parameter of the specific distributed node to a central processing apparatus, wherein the local model parameter is generated by the specific distributed node based on its local training data; and controlling the transmitter to transmit data collection information of the local training data of the specific distributed node to the central processing apparatus, wherein the data collection information is information used by the central processing apparatus to determine the correlation between the local training data of the specific distributed node and local training data of other distributed nodes that have been determined to be used to generate the global model the parameter;

wherein the data collection information includes node locations of distributed nodes, wherein the specific correlation requirement includes the specific distributed node being outside associated exclusive regions of the other distributed nodes that have been determined to be used to generate the global model parameter, and wherein an associated exclusive region of a distributed node is defined by:

a region in which the distance from each point of the region to the distributed node is less than an exclusive distance, or a set of a second predetermined number of distributed nodes closest in distance to the distributed node.

6. The method of claim 5, further comprising:

adjusting a parameter for acquiring channel resources according to both of a network performance parameter and a local training performance parameter of the specific distributed node.

7. The method of claim 5, further comprising:

controlling the transmitter to stop acquiring channel resources for transmitting the local model parameter to the central processing apparatus after receiving an instruction to stop uploading from the central processing apparatus.

8. The method of claim 5, further comprising:

determine a number of the other distributed nodes that have been determined to be used to generate the global model parameter; and controlling the transmitter to stop acquiring channel resources for transmitting the local model parameter to the central processing apparatus after the number is equal to or greater than a first predetermined number.

9. A non-transitory computer medium containing instructions for a method for federated learning that is performed by an electronic device that comprises a processing circuitry and a transmitter, the method comprising:

determining that a specific distributed node will be used to generate a global model parameter, wherein a correlation between local training data of the specific distributed node and local training data of other distributed nodes for generating the global model parameter meets a specific correlation requirement; and controlling the transmitter to transmit a local model parameter of the specific distributed node to a central processing apparatus, wherein the local model parameter is generated by the specific distributed node based on its local training data; and controlling the transmitter to transmit data collection information of the local training data of the specific distributed node to the central processing apparatus, wherein the data collection information is information used by the central processing apparatus to determine the correlation between the local training data of the specific distributed node and local training data of other distributed nodes that have been determined to be used to generate the global model the parameter;

wherein the data collection information includes node locations of distributed nodes, wherein the specific correlation requirement includes the specific distributed node being outside associated exclusive regions of the other distributed nodes that have been determined to be used to generate the global model parameter, and wherein an associated exclusive region of a distributed node is defined by:

a region in which the distance from each point of the region to the distributed node is less than an exclusive distance, or a set of a second predetermined number of distributed nodes closest in distance to the distributed node.

10. The electronic device of claim 1, wherein the processing circuitry is further configured to determine that the specific distributed node will be used to generate the global model parameter based on an instruction to upload the local model parameter from the central processing apparatus.

11. The method of claim 5, further comprising:

determining that the specific distributed node will be used to generate the global model parameter based on an instruction to upload the local model parameter from the central processing apparatus.

12. The non-transitory computer medium of claim 9, wherein the method further comprises:

determining that the specific distributed node will be used to generate the global model parameter based on an instruction to upload the local model parameter from the central processing apparatus.

* * * * *